US012250313B2

(12) United States Patent
Joseph et al.

(10) Patent No.: US 12,250,313 B2
(45) Date of Patent: Mar. 11, 2025

(54) MULTIFACTOR AUTHENTICATION USING BLOCKCHAIN TRANSACTIONS

(71) Applicant: nChain Licensing AG, Zug (CH)

(72) Inventors: Daniel Joseph, London (GB); Craig Steven Wright, London (GB)

(73) Assignee: nChain Licensing AG, Zug (CH)

( * ) Notice: Subject to any disclaimer, the term of this patent is extended or adjusted under 35 U.S.C. 154(b) by 284 days.

(21) Appl. No.: 17/776,573

(22) PCT Filed: Oct. 15, 2020

(86) PCT No.: PCT/IB2020/059676
§ 371 (c)(1),
(2) Date: May 12, 2022

(87) PCT Pub. No.: WO2021/094854
PCT Pub. Date: May 20, 2021

(65) Prior Publication Data
US 2022/0393871 A1     Dec. 8, 2022

(30) Foreign Application Priority Data
Nov. 15, 2019    (GB) ..................... 1916644

(51) Int. Cl.
*H04L 9/32*     (2006.01)
*H04L 9/00*     (2022.01)

(52) U.S. Cl.
CPC ............ *H04L 9/321* (2013.01); *H04L 9/3247* (2013.01); *H04L 9/3271* (2013.01); *H04L 9/50* (2022.05)

(58) Field of Classification Search
CPC .... G06Q 20/4014; G06Q 20/425; H04L 9/32; H04L 9/321–3213; H04L 9/3215;

(Continued)

(56) References Cited

U.S. PATENT DOCUMENTS

2017/0317997 A1* 11/2017 Smith ................... H04L 9/14
2021/0064780 A1*  3/2021 Riedel .............. G06Q 30/0185

FOREIGN PATENT DOCUMENTS

CN          106453271 A      2/2017
EP          3396576 A1 * 10/2018 ............. G06F 21/30

(Continued)

OTHER PUBLICATIONS

Bitcoin, "How Many Unconfirmed Childs Can I Have?," Bitcoin Stack Exchange, Retrieved from the Internet: URL: https://bitcoin.stackexchange.com/questions/62900/how-many-unconfirmed-childs-can-i-have on Nov. 13, 2019, 1 page.

(Continued)

*Primary Examiner* — Kevin Bechtel
(74) *Attorney, Agent, or Firm* — Messner Reeves LLP

(57) ABSTRACT

A method of providing credentials to enable a second party to verify an identity of a first party. The first party is associated with a first public key which is registered with a third party. One or more first credentials are provided to the second party. A request transaction is obtained, which comprises a) an input comprising a signature generated based on a respective private key of the third party, and b) an output locked to a second public key of the first party. The second public key is based on the first public key. A confirmation transaction is generated. The confirmation transaction comprises an input that references the output of the request transaction, and a signature generated based on a private key corresponding to the second public key of the first party. The confirmation transaction is transmitted to nodes of a blockchain network for inclusion in a blockchain.

20 Claims, 10 Drawing Sheets

(58) Field of Classification Search
CPC ............... H04L 9/3236; H04L 9/3242; H04L 9/3247–3257; H04L 9/3271–3273; H04L 9/50; H04L 2209/56
See application file for complete search history.

(56) References Cited

FOREIGN PATENT DOCUMENTS

| WO | 2019034983 A1 | 2/2019 |
|----|---------------|--------|
| WO | 2019115936 A1 | 6/2019 |
| WO | 2019194803 A1 | 10/2019 |

OTHER PUBLICATIONS

Combined Search and Examination Report for Application No. GB1916644.6, Apr. 29, 2020, 8 pages.
"Diffie Hellman," Sep. 3, 2019, Retrieved from the Internet: URL: https://www.sciencedirect.com/topics/computer-science/diffie-hellman, 8 pages.
Franco P., "Understanding Bitcoin: Cryptography, Engineering and Economics," Wiley, Nov. 24, 2014, 238 pages.
Hydro, "What is Raindrop?," Hydro's Raindrop Phase, Retrieved from the Internet: URL: https://projecthydro.org/raindrop-phase/# on Nov. 13, 2019, 5 pages.
International Search Report and Written Opinion issued in International Application No. PCT/IB2020/059676, mailed on Jan. 13, 2021, 14 pages.
Ouaddah A., et al., "FairAccess: A New Blockchain-Based Access Control Framework for the Internet of Things: FairAccess: A New Access Control Framework for IoT," Security and Communication Networks, Feb. 2017, vol. 9, No. 18, 23 pages.
Protectimus, "The Pros and Cons of Different Two-Factor Authentication Types and Methods," Retrieved from the Internet: URL: https://www.protectimus.com/blog/two-factor-authentication-types-and-methods/ on Nov. 13, 2019, 10 pages.
Redman J., "Bitcoin Cash Community Bolsters Instant Transactions," Bitcoin News, Apr. 2, 2018, retrieved from the Internet: URL: https://news.bitcoin.com/bitcoin-cash-community-bolsters-instant-transactions/ on Nov. 13, 2019, 8 pages.
Redman J., "Bitcoin Cash Community Embraces Zero Confirmation Transactions," Bitcoin News, Jul. 1, 2018, retrieved from the Internet: URL: https://news.bitcoin.com/bitcoin-cash-community-embraces-zero-confirmation-transactions/ on Nov. 13, 2019, 10 pages.
Rouse M., "Multifactor Authentication (MFA)," SearchSecurity.com, Retrieved from the Internet: URL: https://searchsecurity.techtarget.com/definition/multifactor-authentication-MFA on Nov. 13, 2019, 3 pages.
The Economist, "Where are the Flaws in Two-Factor Authentication?," The Economist explains, Sep. 13, 2017, Retrieved from the Internet: URL: https://www.economist.com/the-economist-explains/2017/09/13/where-are-the-flaws-in-two-factor-authentication, 6 pages.
Vo T., "HYDRO-Potential Project 2FA Just Got Better With Hydrogen," Hydrogen, May 17, 2018, Retrieved from the Internet: URL: https://medium.com/@vminhtr_42068/hydro-potential-project-and-the-future-of-2fa-apps-e7bf99948968 on Nov. 13, 2019, 7 pages.
Wiki, "Secp256k1—Bitcoin Wiki," En.bitcoin.it, 2019, retrieved from internet: https://en.bitcoin.itlwiki/Secp256k1, 2 pages.
Fuchita Y., "Special Feature: Innovation and Finance—Blockchain and Financial Transaction innovation," Nomura Capital Markets Quarterly, Japan, Nomura Institute of Capital Markets Research, Nov. 1, 2015, vol. 19, No. 2, 30 Pages.
Kakei S., et al., "Proposal of Cross-Certification Using Smart-Contract Toward Distributed Authentication Infrastructure," Computer Security Symposium 2019, Japan, Information Processing Society of Japan, Oct. 14, 2019, pp. 539-546.
Tsuchida T., et al., "Pseudo-Random Function Based Authentication Scheme using Blockchain for Self-Sovereignty Identification," IEICE Technical Report, Security Psychology and Trust (SPT), Japan, Information Processing Society of Japan, Feb. 28, 2019, 2019-SPT-32, pp. 1-6.

\* cited by examiner

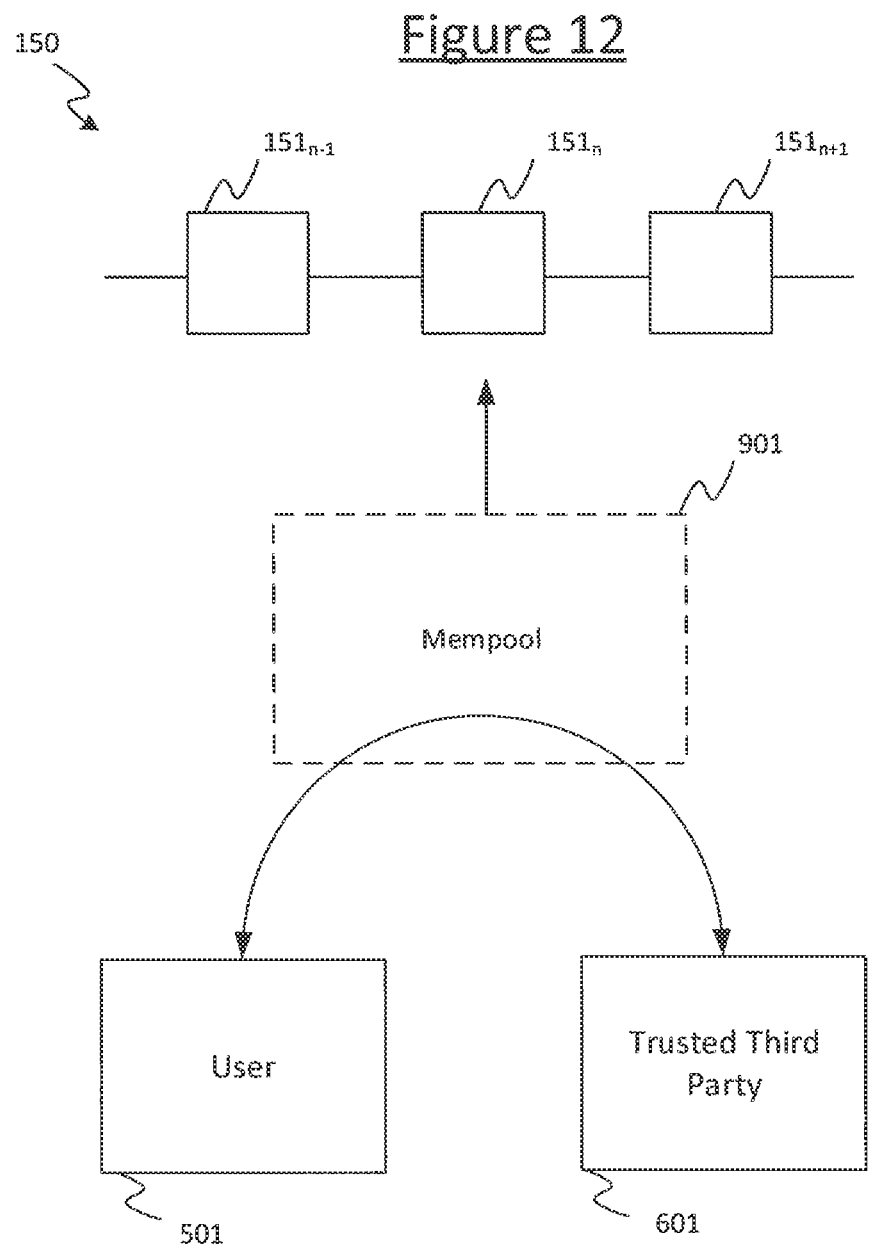

MULTIFACTOR AUTHENTICATION USING BLOCKCHAIN TRANSACTIONS

CROSS REFERENCE TO RELATED APPLICATIONS

This application is the U.S. National Stage of International Application No. PCT/IB2020/059676 filed on Oct. 15, 2020, which claims the benefit of United Kingdom Patent Application No. 1916644.6, filed on Nov. 15, 2019, the contents of which are incorporated herein by reference in their entireties.

TECHNICAL FIELD

The present disclosure relates to methods for verifying an identity of a party using blockchain transactions.

BACKGROUND

A blockchain refers to a form of distributed data structure, wherein a duplicate copy of the blockchain is maintained at each of a plurality of nodes in a peer-to-peer (P2P) network. The blockchain comprises a chain of blocks of data, wherein each block comprises one or more transactions. Each transaction may point back to a preceding transaction in a sequence which may span one or more blocks. Transactions can be submitted to the network to be included in new blocks by a process known as "mining", which involves each of a plurality of mining nodes competing to perform "proof-of-work", i.e. solving a cryptographic puzzle based on a pool of the pending transactions waiting to be included in blocks.

Conventionally the transactions in the blockchain are used to convey a digital asset, i.e. data acting as a store of value. However, a blockchain can also be exploited in order to layer additional functionality on top of the blockchain. For instance, blockchain protocols may allow for storage of additional user data in an output of a transaction. Modern blockchains are increasing the maximum data capacity that can be stored within a single transaction, enabling more complex data to be incorporated. For instance, this may be used to store an electronic document in the blockchain, or even audio or video data.

Each node in the network can have any one, two or all of three roles: forwarding, mining and storage. Forwarding nodes propagate transactions throughout the nodes of the network. Mining nodes perform the mining of transactions into blocks. Storage nodes each store their own copy of the mined blocks of the blockchain. In order to have a transaction recorded in the blockchain, a party sends the transaction to one of the nodes of the network to be propagated. Mining nodes which receive the transaction may race to mine the transaction into a new block. Each node is configured to respect the same node protocol, which will include one or more conditions for a transaction to be valid. Invalid transactions will not be propagated nor mined into blocks. Assuming the transaction is validated and thereby accepted onto the blockchain, the additional user data will thus remain stored at each of the nodes in the P2P network as an immutable public record.

Multi-factor authentication (MFA) is increasingly being introduced in a variety of systems where the verification of individuals or entities that seek to access the system is required. For instance, MFA may be used when attempting to access an online bank account. MFA is a verification protocol where the entity requiring access to a system is asked to provide multiple methods of authentication, usually from independent categories of credentials. Usually the first factor is that of a password whereas the other factor can range from biometric data to SMS texts. These MFA schemes are expected to produce an increased level of security for systems in which they are utilised.

SUMMARY

2-Factor Authentication (2FA) refers to a type of MFA wherein two different forms of credential are required to verify, or authenticate, an identity of a user. For 2FA, SMS texts are commonly used. In such an implementation, after submitting their password, an SMS text containing a specific code is sent to the user. The user then uses this code as the second authentication factor. The premise for the security of such a system is that it is unlikely that a malicious actor would have access to their target's SMS phone and/or texts (in addition to the target's password).

However, despite the growth in the incorporation of 2FA into verification protocols, issues and vulnerabilities exist in such 2FA designs. As an example, SIM swap opportunities allow attackers to steal their target's phone number, meaning SMS messages can be intercepted and thus the authentication code can be obtained.

There is therefore a need for an improved, more secure protocol which addresses the current issues with multi-factor authorisation, in particular, one which is not vulnerable to the interception of authentication codes by attackers attempting to steal an individual's identity.

According to one aspect disclosed herein, there is provided a method of providing credentials to enable a second party to verify an identity of a first party, wherein the first party is associated with a first public key, wherein the first public key is registered with a third party, and wherein the method comprises: providing one or more first credentials to the second party; obtaining a request transaction, the request transaction being a blockchain transaction that has been transmitted to one or more nodes of the blockchain network and comprises a) an input comprising a signature generated based on a respective private key of the third party, and b) an output locked to a second public key of the first party, wherein the second public key is based on the first public key; generating a confirmation transaction, the confirmation transaction being a blockchain transaction comprising an input that references the output of the request transaction, and a signature generated based on a private key corresponding to the second public key of the first party; and causing the confirmation transaction to be transmitted to one or more nodes of a blockchain network for inclusion in a blockchain.

Due to the cryptographic nature of public-private key pairs, only a party with access to the correct private key can generate a signature that can be verified using the corresponding public key registered with the third party. Therefore the signed confirmation transaction acts as a further (e.g. second) credential (or authentication factor) which can be used to verify the first party's identity. Since the request transaction has an output locked to the registered public key, only the first party can generate a transaction (the confirmation transaction) which unlocks (i.e. spends) that output. Any party can therefore verify the first party's identity by checking to see whether the first party has generated the confirmation transaction. If a party cannot generate the confirmation transaction, they do not have access to the correct private key, and therefore they are not the first party.

Note that in order to register their public key with the third party, the first party does not need to share their private key (hence the word private). In fact, the first party does not ever need to share their private key with any other party. Therefore the provided method does not rely on the sharing of any authentication codes or the like, thus denying an attacker the opportunity to intercept such codes and use them to falsely identify themselves as the first party.

The method may be used as part of a 2FA protocol, where the signed confirmation transaction is a second credential (or authentication factor). However, more generally the method may be used as any MFA protocol, where the signed confirmation transaction is an $n^{th}$ credential.

As an illustrative example, a user (the first party) may be a customer of a merchant (the second party) and may have registered their public key with their bank (the third party). When attempting to make a purchase from the merchant, the customer provides a first credential to the merchant, e.g. credit card information, name and address, contact number, etc. The merchant may ask the bank to verify the identity of the user and so the bank generates the request transaction, payable to the public key registered by the first party. The public key may be registered as part of the bank's know-your-customer (KYC) protocol. The user obtains the request transaction, e.g. by scanning the blockchain, and then generates a signed confirmation transaction. The bank, seeing that the confirmation transaction has been signed with a signature that only the first party, if they have the private key corresponding to the registered public, could generate, informs the merchant that the user they are dealing with is indeed the first party. The merchant and the user can then continue with their transaction, e.g. purchase of goods or services.

As another example, the user (first party) may be attempting to access their email account hosted by an online provider (second party). The user first provides their username and password, and in response, a request transaction is submitted to nodes of the blockchain network. The request transaction may be generated by the online provider (in which case the third party is the second party), or by a trusted third party. Upon generated a signed confirmation transaction, the user is granted access to their email account.

According to another aspect disclosed herein, there is provided a method of verifying an identify of a first party, wherein the first party is associated with a first public key, wherein the first public key is registered with a third party, and wherein the method comprises: receiving a request to verify the identity of the first party; generating a request transaction, the request transaction being a blockchain transaction comprising a) an input comprising a signature generated based on a respective private key of the third party, and b) an output locked to a second public key of the first party, wherein the second public key is based on the first public key; causing the request transaction to be transmitted to one or more nodes of a blockchain network for inclusion in a blockchain; and determining whether a confirmation transaction has been transmitted to one or more nodes of the blockchain network for inclusion in the blockchain, the confirmation transaction being a blockchain transaction comprising an input that references the output of the request transaction, and a signature generated based on a private key corresponding to the second public key of the first party.

As mentioned above, an output of the request transaction is locked to the registered public key. For instance, the output may be a pay-to-public-key-hash (P2PKH) output, which requires an input of a spending transaction to contain the registered public key and a signature generated with a private key corresponding to the registered public key. Only the first party has knowledge of the private key required to correctly generate such an input. Therefore, a party (e.g. the second or third party) can verify the identity of the user reporting to be the first party by determining whether a confirmation transaction that spends the request transaction has been submitted to the blockchain network. Note that neither the request transaction nor the confirmation transaction must be recorded in the blockchain in order for the first party's identity to be verified, as will be discussed below.

In some cases, the second party may use an independent third party (e.g. a trusted third party) as part of the protocol for verifying a party's identity. In other cases, the second party may itself be the third party that registers the first party's public key.

BRIEF DESCRIPTION OF THE DRAWINGS

To assist understanding of embodiments of the present disclosure and to show how such embodiments may be put into effect, reference is made, by way of example only, to the accompanying drawings in which:

FIG. 12 schematically illustrates how the mempool may act as a communication medium.

DETAILED DESCRIPTION OF EMBODIMENTS

Example System Overview

Figure 1:
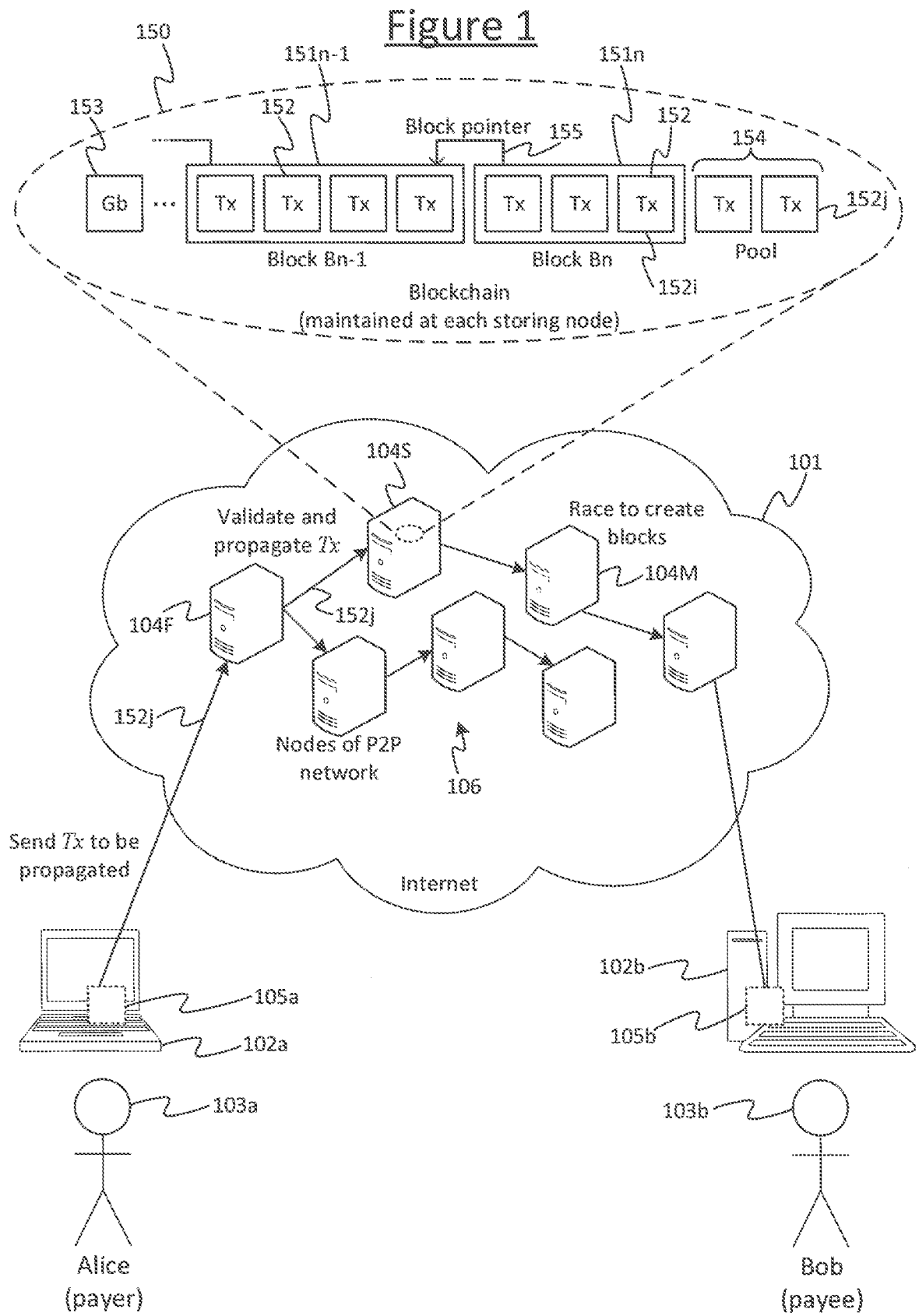
FIG. 1 is a schematic block diagram of a system for implementing a blockchain.

FIG. 1 shows an example system 100 for implementing a blockchain 150 generally. The system 100 comprises a packet-switched network 101, typically a wide-area inter-network such as the Internet. The packet-switched network 101 comprises a plurality of nodes 104 arranged to form a peer-to-peer (P2P) overlay network 106 within the packet-switched network 101. Each node 104 comprises computer equipment of a peers, with different ones of the nodes 104 belonging to different peers. Each node 104 comprises processing apparatus comprising one or more processors, e.g. one or more central processing units (CPUs), accelerator processors, application specific processors and/or field programmable gate arrays (FPGAs). Each node also comprises memory, i.e. computer-readable storage in the form of a non-transitory computer-readable medium or media. The memory may comprise one or more memory units employing one or more memory media, e.g. a magnetic medium such as a hard disk; an electronic medium such as a solid-state drive (SSD), flash memory or EEPROM; and/or an optical medium such as an optical disk drive.

The blockchain 150 comprises a chain of blocks of data 151, wherein a respective copy of the blockchain 150 is maintained at each of a plurality of nodes in the P2P network 160. Each block 151 in the chain comprises one or more transactions 152, wherein a transaction in this context refers to a kind of data structure. The nature of the data structure will depend on the type of transaction protocol used as part of a transaction model or scheme. A given blockchain will typically use one particular transaction protocol throughout. In one common type of transaction protocol, the data structure of each transaction 152 comprises at least one input and at least one output. Each output specifies an amount representing a quantity of a digital asset belonging to a user 103 to whom the output is cryptographically locked (requiring a signature of that user in order to be unlocked and thereby redeemed or spent). Each input points back to the output of a preceding transaction 152, thereby linking the transactions.

At least some of the nodes 104 take on the role of forwarding nodes 104F which forward and thereby propagate transactions 152. At least some of the nodes 104 take on the role of miners 104M which mine blocks 151. At least some of the nodes 104 take on the role of storage nodes 104S (sometimes also called "full-copy" nodes), each of which stores a respective copy of the same blockchain 150 in their respective memory. Each miner node 104M also maintains a pool 154 of transactions 152 waiting to be mined into blocks 151. A given node 104 may be a forwarding node 104, miner 104M, storage node 104S or any combination of two or all of these.

In a given present transaction 152j, the (or each) input comprises a pointer referencing the output of a preceding transaction 152i in the sequence of transactions, specifying that this output is to be redeemed or "spent" in the present transaction 152j. In general, the preceding transaction could be any transaction in the pool 154 or any block 151. The preceding transaction 152i need not necessarily exist at the time the present transaction 152j is created or even sent to the network 106, though the preceding transaction 152i will need to exist and be validated in order for the present transaction to be valid. Hence "preceding" herein refers to a predecessor in a logical sequence linked by pointers, not necessarily the time of creation or sending in a temporal sequence, and hence it does not necessarily exclude that the transactions 152i, 152j be created or sent out-of-order (see discussion below on orphan transactions). The preceding transaction 152i could equally be called the antecedent or predecessor transaction.

The input of the present transaction 152j also comprises the signature of the user 103a to whom the output of the preceding transaction 152i is locked. In turn, the output of the present transaction 152j can be cryptographically locked to a new user 103b. The present transaction 152j can thus transfer the amount defined in the input of the preceding transaction 152i to the new user 103b as defined in the output of the present transaction 152j. In some cases a transaction 152 may have multiple outputs to split the input amount between multiple users (one of whom could be the original user 103a in order to give change). In some cases a transaction can also have multiple inputs to gather together the amounts from multiple outputs of one or more preceding transactions, and redistribute to one or more outputs of the current transaction.

The above may be referred to as an "output-based" transaction protocol, sometimes also referred to as an unspent transaction output (UTXO) type protocol (where the outputs are referred to as UTXOs). A user's total balance is not defined in any one number stored in the blockchain, and instead the user needs a special "wallet" application 105 to collate the values of all the UTXOs of that user which are scattered throughout many different transactions 152 in the blockchain 151.

An alternative type of transaction protocol may be referred to as an "account-based" protocol, as part of an account-based transaction model. In the account-based case, each transaction does not define the amount to be transferred by referring back to the UTXO of a preceding transaction in a sequence of past transactions, but rather by reference to an absolute account balance. The current state of all accounts is stored by the miners separate to the blockchain and is updated constantly. In such a system, transactions are ordered using a running transaction tally of the account (also called the "position"). This value is signed by the sender as part of their cryptographic signature and is hashed as part of the transaction reference calculation. In addition, an optional data field may also be signed the transaction. This data field may point back to a previous transaction, for example if the previous transaction ID is included in the data field.

With either type of transaction protocol, when a user 103 wishes to enact a new transaction 152j, then he/she sends the new transaction from his/her computer terminal 102 to one of the nodes 104 of the P2P network 106 (which nowadays are typically servers or data centres, but could in principle be other user terminals). This node 104 checks whether the transaction is valid according to a node protocol which is applied at each of the nodes 104. The details of the node protocol will correspond to the type of transaction protocol being used in the blockchain 150 in question, together forming the overall transaction model. The node protocol typically requires the node 104 to check that the cryptographic signature in the new transaction 152j matches the expected signature, which depends on the previous transaction 152i in an ordered sequence of transactions 152. In an output-based case, this may comprise checking that the cryptographic signature of the user included in the input of the new transaction 152j matches a condition defined in the output of the preceding transaction 152i which the new transaction spends, wherein this condition typically comprises at least checking that the cryptographic signature in the input of the new transaction 152j unlocks the output of the previous transaction 152i to which the input of the new transaction points. In some transaction protocols the condition may be at least partially defined by a custom script included in the input and/or output. Alternatively it could simply be a fixed by the node protocol alone, or it could be due to a combination of these. Either way, if the new transaction 152j is valid, the current node forwards it to one or more others of the nodes 104 in the P2P network 106. At least some of these nodes 104 also act as forwarding nodes 104F, applying the same test according to the same node protocol, and so forward the new transaction 152j on to one or more further nodes 104, and so forth. In this way the new transaction is propagated throughout the network of nodes 104.

In an output-based model, the definition of whether a given output (e.g. UTXO) is spent is whether it has yet been validly redeemed by the input of another, onward transaction 152*j* according to the node protocol. Another condition for a transaction to be valid is that the output of the preceding transition 152*i* which it attempts to spend or redeem has not already been spent/redeemed by another valid transaction. Again if not valid, the transaction 152*j* will not be propagated or recorded in the blockchain. This guards against double-spending whereby the spender tries to spend the output of the same transaction more than once. An account-based model on the other hand guards against double-spending by maintaining an account balance. Because again there is a defined order of transactions, the account balance has a single defined state at any one time.

In addition to validation, at least some of the nodes 104M also race to be the first to create blocks of transactions in a process known as mining, which is underpinned by "proof of work". At a mining node 104M, new transactions are added to a pool of valid transactions that have not yet appeared in a block. The miners then race to assemble a new valid block 151 of transactions 152 from the pool of transactions 154 by attempting to solve a cryptographic puzzle. Typically this comprises searching for a "nonce" value such that when the nonce is concatenated with the pool of transactions 154 and hashed, then the output of the hash meets a predetermined condition. E.g. the predetermined condition may be that the output of the hash has a certain predefined number of leading zeros. A property of a hash function is that it has an unpredictable output with respect to its input. Therefore this search can only be performed by brute force, thus consuming a substantive amount of processing resource at each node 104M that is trying to solve the puzzle.

The first miner node 104M to solve the puzzle announces this to the network 106, providing the solution as proof which can then be easily checked by the other nodes 104 in the network (once given the solution to a hash it is straightforward to check that it causes the output of the hash to meet the condition). The pool of transactions 154 for which the winner solved the puzzle then becomes recorded as a new block 151 in the blockchain 150 by at least some of the nodes 104 acting as storage nodes 104S, based on having checked the winner's announced solution at each such node. A block pointer 155 is also assigned to the new block 151*n* pointing back to the previously created block 151*n*−1 in the chain. The proof-of-work helps reduce the risk of double spending since it takes a large amount of effort to create a new block 151, and as any block containing a double spend is likely to be rejected by other nodes 104, mining nodes 104M are incentivised not to allow double spends to be included in their blocks. Once created, the block 151 cannot be modified since it is recognized and maintained at each of the storing nodes 104S in the P2P network 106 according to the same protocol. The block pointer 155 also imposes a sequential order to the blocks 151. Since the transactions 152 are recorded in the ordered blocks at each storage node 104S in a P2P network 106, this therefore provides an immutable public ledger of the transactions.

Note that different miners 104M racing to solve the puzzle at any given time may be doing so based on different snapshots of the unmined transaction pool 154 at any given time, depending on when they started searching for a solution. Whoever solves their respective puzzle first defines which transactions 152 are included in the next new block 151*n*, and the current pool 154 of unmined transactions is updated. The miners 104M then continue to race to create a block from the newly defined outstanding pool 154, and so forth. A protocol also exists for resolving any "fork" that may arise, which is where two miners 104M solve their puzzle within a very short time of one another such that a conflicting view of the blockchain gets propagated. In short, whichever prong of the fork grows the longest becomes the definitive blockchain 150.

In most blockchains the winning miner 104M is automatically rewarded with a special kind of new transaction which creates a new quantity of the digital asset out of nowhere (as opposed to normal transactions which transfer an amount of the digital asset from one user to another). Hence the winning node is said to have "mined" a quantity of the digital asset. This special type of transaction is sometime referred to as a "generation" transaction. It automatically forms part of the new block 151*n*. This reward gives an incentive for the miners 104M to participate in the proof-of-work race. Often a regular (non-generation) transaction 152 will also specify an additional transaction fee in one of its outputs, to further reward the winning miner 104M that created the block 151*n* in which that transaction was included.

Due to the computational resource involved in mining, typically at least each of the miner nodes 104M takes the form of a server comprising one or more physical server units, or even whole a data centre. Each forwarding node 104M and/or storage node 104S may also take the form of a server or data centre. However in principle any given node 104 could take the form of a user terminal or a group of user terminals networked together.

The memory of each node 104 stores software configured to run on the processing apparatus of the node 104 in order to perform its respective role or roles and handle transactions 152 in accordance with the node protocol. It will be understood that any action attributed herein to a node 104 may be performed by the software run on the processing apparatus of the respective computer equipment. Also, the term "blockchain" as used herein is a generic term that refers to the kind of technology in general, and does not limit to any particular proprietary blockchain, protocol or service.

Also connected to the network 101 is the computer equipment 102 of each of a plurality of parties 103 in the role of consuming users. These act as payers and payees in transactions but do not necessarily participate in mining or propagating transactions on behalf of other parties. They do not necessarily run the mining protocol. Two parties 103 and their respective equipment 102 are shown for illustrative purposes: a first party 103*a* and his/her respective computer equipment 102*a*, and a second party 103*b* and his/her respective computer equipment 102*b*. It will be understood that many more such parties 103 and their respective computer equipment 102 may be present and participating in the system, but for convenience they are not illustrated. Each party 103 may be an individual or an organization. Purely by way of illustration the first party 103*a* is referred to herein as Alice and the second party 103*b* is referred to as Bob, but it will be appreciated that this is not limiting and any reference herein to Alice or Bob may be replaced with "first party" and "second party" respectively.

The computer equipment 102 of each party 103 comprises respective processing apparatus comprising one or more processors, e.g. one or more CPUs, GPUs, other accelerator processors, application specific processors, and/or FPGAs. The computer equipment 102 of each party 103 further comprises memory, i.e. computer-readable storage in the form of a non-transitory computer-readable medium or media. This memory may comprise one or more memory units employing one or more memory media, e.g. a magnetic medium such as hard disk; an electronic medium such as an SSD, flash memory or EEPROM; and/or an optical medium such as an optical disc drive. The memory on the computer equipment 102 of each party 103 stores software comprising a respective instance of at least one client application 105 arranged to run on the processing apparatus. It will be understood that any action attributed herein to a given party 103 may be performed using the software run on the processing apparatus of the respective computer equipment 102. The computer equipment 102 of each party 103 comprises at least one user terminal, e.g. a desktop or laptop computer, a tablet, a smartphone, or a wearable device such as a smartwatch. The computer equipment 102 of a given party 103 may also comprise one or more other networked resources, such as cloud computing resources accessed via the user terminal.

The client application or software 105 may be initially provided to the computer equipment 102 of any given party 103 on suitable computer-readable storage medium or media, e.g. downloaded from a server, or provided on a removable storage device such as a removable SSD, flash memory key, removable EEPROM, removable magnetic disk drive, magnetic floppy disk or tape, optical disk such as a CD or DVD ROM, or a removable optical drive, etc.

The client application 105 comprises at least a "wallet" function. This has two main functionalities. One of these is to enable the respective user party 103 to create, sign and send transactions 152 to be propagated throughout the network of nodes 104 and thereby included in the blockchain 150. The other is to report back to the respective party the amount of the digital asset that he or she currently owns. In an output-based system, this second functionality comprises collating the amounts defined in the outputs of the various 152 transactions scattered throughout the blockchain 150 that belong to the party in question.

The instance of the client application 105 on each computer equipment 102 is operatively coupled to at least one of the forwarding nodes 104F of the P2P network 106. This enables the wallet function of the client 105 to send transactions 152 to the network 106. The client 105 is also able to contact one, some or all of the storage nodes 104 in order to query the blockchain 150 for any transactions of which the respective party 103 is the recipient (or indeed inspect other parties' transactions in the blockchain 150, since in embodiments the blockchain 150 is a public facility which provides trust in transactions in part through its public visibility). The wallet function on each computer equipment 102 is configured to formulate and send transactions 152 according to a transaction protocol. Each node 104 runs software configured to validate transactions 152 according to a node protocol, and in the case of the forwarding nodes 104F to forward transactions 152 in order to propagate them throughout the network 106. The transaction protocol and node protocol correspond to one another, and a given transaction protocol goes with a given node protocol, together implementing a given transaction model. The same transaction protocol is used for all transactions 152 in the blockchain 150 (though the transaction protocol may allow different subtypes of transaction within it). The same node protocol is used by all the nodes 104 in the network 106 (though it many handle different subtypes of transaction differently in accordance with the rules defined for that subtype, and also different nodes may take on different roles and hence implement different corresponding aspects of the protocol).

As mentioned, the blockchain 150 comprises a chain of blocks 151, wherein each block 151 comprises a set of one or more transactions 152 that have been created by a proof-of-work process as discussed previously. Each block 151 also comprises a block pointer 155 pointing back to the previously created block 151 in the chain so as to define a sequential order to the blocks 151. The blockchain 150 also comprises a pool of valid transactions 154 waiting to be included in a new block by the proof-of-work process. Each transaction 152 (other than a generation transaction) comprises a pointer back to a previous transaction so as to define an order to sequences of transactions (N.B. sequences of transactions 152 are allowed to branch). The chain of blocks 151 goes all the way back to a genesis block (Gb) 153 which was the first block in the chain. One or more original transactions 152 early on in the chain 150 pointed to the genesis block 153 rather than a preceding transaction.

When a given party 103, say Alice, wishes to send a new transaction 152$j$ to be included in the blockchain 150, then she formulates the new transaction in accordance with the relevant transaction protocol (using the wallet function in her client application 105). She then sends the transaction 152 from the client application 105 to one of the one or more forwarding nodes 104F to which she is connected. E.g. this could be the forwarding node 104F that is nearest or best connected to Alice's computer 102. When any given node 104 receives a new transaction 152$j$, it handles it in accordance with the node protocol and its respective role. This comprises first checking whether the newly received transaction 152$j$ meets a certain condition for being "valid", examples of which will be discussed in more detail shortly. In some transaction protocols, the condition for validation may be configurable on a per-transaction basis by scripts included in the transactions 152. Alternatively the condition could simply be a built-in feature of the node protocol, or be defined by a combination of the script and the node protocol.

On condition that the newly received transaction 152$j$ passes the test for being deemed valid (i.e. on condition that it is "validated"), any storage node 104S that receives the transaction 152$j$ will add the new validated transaction 152 to the pool 154 in the copy of the blockchain 150 maintained at that node 104S. Further, any forwarding node 104F that receives the transaction 152$j$ will propagate the validated transaction 152 onward to one or more other nodes 104 in the P2P network 106. Since each forwarding node 104F applies the same protocol, then assuming the transaction 152$j$ is valid, this means it will soon be propagated throughout the whole P2P network 106.

Once admitted to the pool 154 in the copy of the blockchain 150 maintained at one or more storage nodes 104, then miner nodes 104M will start competing to solve the proof-of-work puzzle on the latest version of the pool 154 including the new transaction 152 (other miners 104M may still be trying to solve the puzzle based on the old view of the pool 154, but whoever gets there first will define where the next new block 151 ends and the new pool 154 starts, and eventually someone will solve the puzzle for a part of the pool 154 which includes Alice's transaction 152$j$). Once the proof-of-work has been done for the pool 154 including the new transaction 152$j$, it immutably becomes part of one of the blocks 151 in the blockchain 150. Each transaction 152 comprises a pointer back to an earlier transaction, so the order of the transactions is also immutably recorded.

UTXO-Based Model

Figure 2:
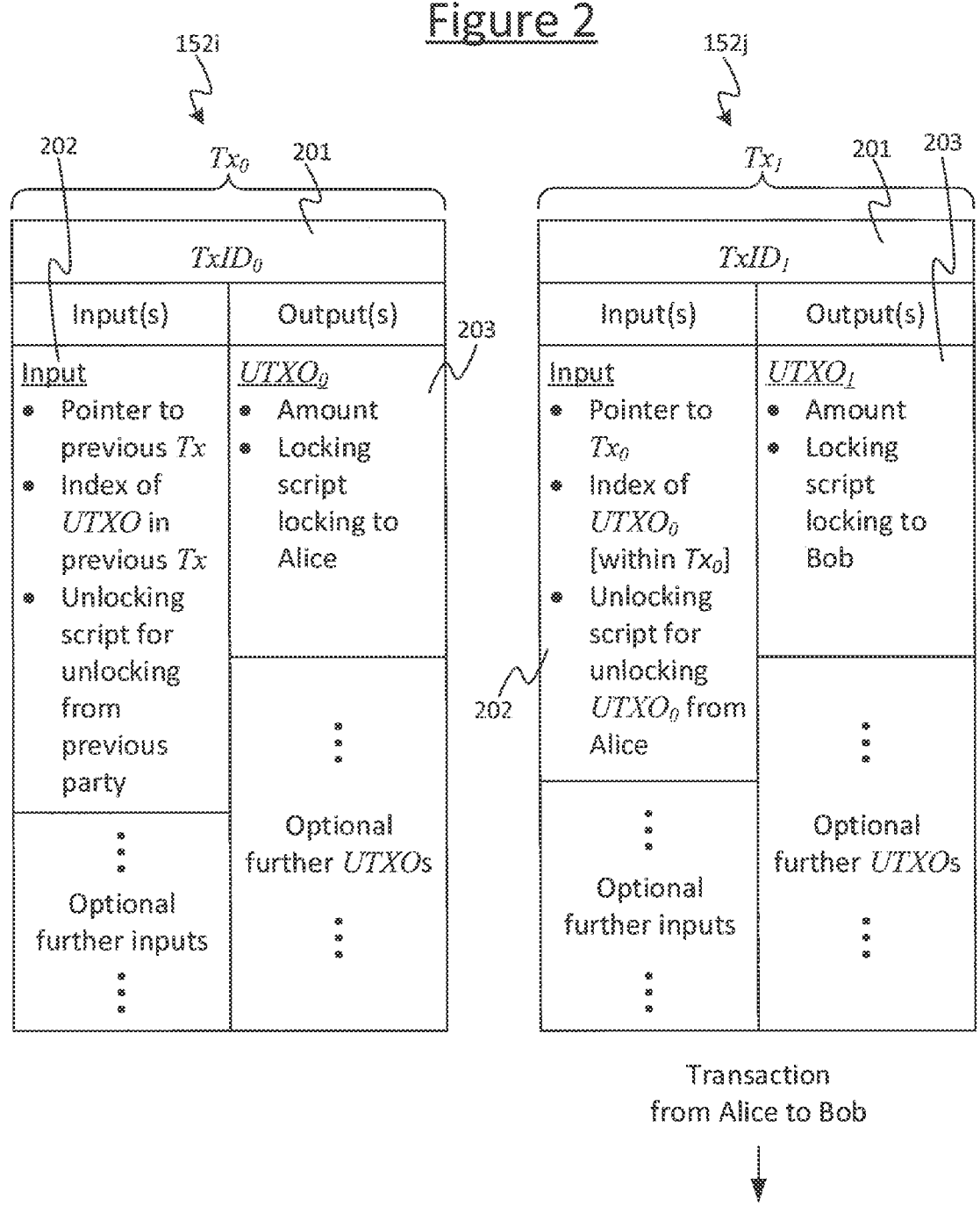
FIG. 2 schematically illustrates some examples of transactions which may be recorded in a blockchain.

FIG. 2 illustrates an example transaction protocol. This is an example of an UTXO-based protocol. A transaction 152 (abbreviated "Tx") is the fundamental data structure of the blockchain 150 (each block 151 comprising one or more transactions 152). The following will be described by reference to an output-based or "UTXO" based protocol. However, this not limiting to all possible embodiments.

In a UTXO-based model, each transaction ("Tx") 152 comprises a data structure comprising one or more inputs 202, and one or more outputs 203. Each output 203 may comprise an unspent transaction output (UTXO), which can be used as the source for the input 202 of another new transaction (if the UTXO has not already been redeemed). The UTXO specifies an amount of a digital asset (a store of value). It may also contain the transaction ID of the transaction from which it came, amongst other information. The transaction data structure may also comprise a header 201, which may comprise an indicator of the size of the input field(s) 202 and output field(s) 203. The header 201 may also include an ID of the transaction. In embodiments the transaction ID is the hash of the transaction data (excluding the transaction ID itself) and stored in the header 201 of the raw transaction 152 submitted to the miners 104M.

Note that whilst each output in FIG. 2 is shown as a UTXO, a transaction may additionally or alternatively comprise one or more unspendable transaction outputs.

Say Alice 103a wishes to create a transaction 152j transferring an amount of the digital asset in question to Bob 103b. In FIG. 2 Alice's new transaction 152j is labelled "$Tx_1$". It takes an amount of the digital asset that is locked to Alice in the output 203 of a preceding transaction 152i in the sequence, and transfers at least some of this to Bob. The preceding transaction 152i is labelled "$Tx_0$" in FIG. 2. $Tx_0$ and $Tx_1$ are just an arbitrary labels. They do not necessarily mean that $Tx_0$ is the first transaction in the blockchain 151, nor that $Tx_1$ is the immediate next transaction in the pool 154. $Tx_1$ could point back to any preceding (i.e. antecedent) transaction that still has an unspent output 203 locked to Alice.

The preceding transaction $Tx_0$ may already have been validated and included in the blockchain 150 at the time when Alice creates her new transaction $Tx_1$, or at least by the time she sends it to the network 106. It may already have been included in one of the blocks 151 at that time, or it may be still waiting in the pool 154 in which case it will soon be included in a new block 151. Alternatively $Tx_0$ and $Tx_1$ could be created and sent to the network 102 together, or $Tx_0$ could even be sent after $Tx_1$ if the node protocol allows for buffering "orphan" transactions. The terms "preceding" and "subsequent" as used herein in the context of the sequence of transactions refer to the order of the transactions in the sequence as defined by the transaction pointers specified in the transactions (which transaction points back to which other transaction, and so forth). They could equally be replaced with "predecessor" and "successor", or "antecedent" and "descendant", "parent" and "child", or such like. It does not necessarily imply an order in which they are created, sent to the network 106, or arrive at any given node 104. Nevertheless, a subsequent transaction (the descendent transaction or "child") which points to a preceding transaction (the antecedent transaction or "parent") will not be validated until and unless the parent transaction is validated. A child that arrives at a node 104 before its parent is considered an orphan. It may be discarded or buffered for a certain time to wait for the parent, depending on the node protocol and/or miner behaviour.

One of the one or more outputs 203 of the preceding transaction $Tx_0$ comprises a particular UTXO, labelled here $UTXO_0$. Each UTXO comprises a value specifying an amount of the digital asset represented by the UTXO, and a locking script which defines a condition which must be met by an unlocking script in the input 202 of a subsequent transaction in order for the subsequent transaction to be validated, and therefore for the UTXO to be successfully redeemed. Typically the locking script locks the amount to a particular party (the beneficiary of the transaction in which it is included). I.e. the locking script defines an unlocking condition, typically comprising a condition that the unlocking script in the input of the subsequent transaction comprises the cryptographic signature of the party to whom the preceding transaction is locked.

The locking script (aka scriptPubKey) is a piece of code written in the domain specific language recognized by the node protocol. A particular example of such a language is called "Script" (capital S). The locking script specifies what information is required to spend a transaction output 203, for example the requirement of Alice's signature. Unlocking scripts appear in the outputs of transactions. The unlocking script (aka scriptSig) is a piece of code written the domain specific language that provides the information required to satisfy the locking script criteria. For example, it may contain Bob's signature. Unlocking scripts appear in the input 202 of transactions.

So in the example illustrated, $UTXO_0$ in the output 203 of $Tx_0$ comprises a locking script [Checksig $P_A$] which requires a signature Sig $P_A$ of Alice in order for $UTXO_0$ to be redeemed (strictly, in order for a subsequent transaction attempting to redeem $UTXO_0$ to be valid). [Checksig $P_A$] contains the public key $P_A$ from a public-private key pair of Alice. The input 202 of $Tx_1$ comprises a pointer pointing back to $Tx_1$ (e.g. by means of its transaction ID, $TxID_0$, which in embodiments is the hash of the whole transaction $Tx_0$). The input 202 of $Tx_1$ comprises an index identifying $UTXO_0$ within $Tx_0$, to identify it amongst any other possible outputs of $Tx_0$. The input 202 of $Tx_1$ further comprises an unlocking script <Sig $P_A$> which comprises a cryptographic signature of Alice, created by Alice applying her private key from the key pair to a predefined portion of data (sometimes called the "message" in cryptography). What data (or "message") needs to be signed by Alice to provide a valid signature may be defined by the locking script, or by the node protocol, or by a combination of these.

When the new transaction $Tx_1$ arrives at a node 104, the node applies the node protocol. This comprises running the locking script and unlocking script together to check whether the unlocking script meets the condition defined in the locking script (where this condition may comprise one or more criteria). In embodiments this involves concatenating the two scripts:

<Sig $P_A$><$P_A$>||[Checksig $P_A$]

where "||" represents a concatenation and "< . . . >" means place the data on the stack, and "[ . . . ]" is a function comprised by the unlocking script (in this example a stack-based language). Equivalently the scripts may be run one after another, with a common stack, rather than concatenating the scripts. Either way, when run together, the scripts use the public key $P_A$ of Alice, as included in the locking script in the output of $Tx_0$, to authenticate that the locking script in the input of $Tx_1$ contains the signature of Alice signing the expected portion of data. The expected portion of data itself (the "message") also needs to be included in $Tx_0$ in order to perform this authentication. In embodiments the signed data comprises the whole of $Tx_0$ (so a separate element does to need to be included specifying the signed portion of data in the clear, as it is already inherently present).

The details of authentication by public-private cryptography will be familiar to a person skilled in the art. Basically, if Alice has signed a message by encrypting it with her private key, then given Alice's public key and the message in the clear (the unencrypted message), another entity such as a node 104 is able to authenticate that the encrypted version of the message must have been signed by Alice. Signing typically comprises hashing the message, signing the hash, and tagging this onto the clear version of the message as a signature, thus enabling any holder of the public key to authenticate the signature.

If the unlocking script in $Tx_1$ meets the one or more conditions specified in the locking script of $Tx_0$ (so in the example shown, if Alice's signature is provided in $Tx_1$ and authenticated), then the node 104 deems $Tx_1$ valid. If it is a mining node 104M, this means it will add it to the pool of transactions 154 awaiting proof-of-work. If it is a forwarding node 104F, it will forward the transaction $Tx_1$ to one or more other nodes 104 in the network 106, so that it will be propagated throughout the network. Once $Tx_1$ has been validated and included in the blockchain 150, this defines $UTXO_0$ from $Tx_0$ as spent. Note that $Tx_1$ can only be valid if it spends an unspent transaction output 203. If it attempts to spend an output that has already been spent by another transaction 152, then $Tx_1$ will be invalid even if all the other conditions are met. Hence the node 104 also needs to check whether the referenced UTXO in the preceding transaction $Tx_0$ is already spent (has already formed a valid input to another valid transaction). This is one reason why it is important for the blockchain 150 to impose a defined order on the transactions 152. In practice a given node 104 may maintain a separate database marking which UTXOs 203 in which transactions 152 have been spent, but ultimately what defines whether a UTXO has been spent is whether it has already formed a valid input to another valid transaction in the blockchain 150.

Note that in UTXO-based transaction models, a given UTXO needs to be spent as a whole. It cannot "leave behind" a fraction of the amount defined in the UTXO as spent while another fraction is spent. However the amount from the UTXO can be split between multiple outputs of the next transaction. E.g. the amount defined in $UTXO_0$ in $Tx_0$ can be split between multiple UTXOs in $Tx_1$. Hence if Alice does not want to give Bob all of the amount defined in $UTXO_0$, she can use the remainder to give herself change in a second output of $Tx_1$, or pay another party.

In practice Alice will also usually need to include a fee for the winning miner, because nowadays the reward of the generation transaction alone is not typically sufficient to motivate mining. If Alice does not include a fee for the miner, $Tx_0$ will likely be rejected by the miner nodes 104M, and hence although technically valid, it will still not be propagated and included in the blockchain 150 (the miner protocol does not force miners 104M to accept transactions 152 if they don't want). In some protocols, the mining fee does not require its own separate output 203 (i.e. does not need a separate UTXO). Instead any different between the total amount pointed to by the input(s) 202 and the total amount of specified in the output(s) 203 of a given transaction 152 is automatically given to the winning miner 104. E.g. say a pointer to $UTXO_0$ is the only input to $Tx_1$, and $Tx_1$ has only one output $UTXO_1$. If the amount of the digital asset specified in $UTXO_0$ is greater than the amount specified in $UTXO_1$, then the difference automatically goes to the winning miner 104M. Alternatively or additionally however, it is not necessarily excluded that a miner fee could be specified explicitly in its own one of the UTXOs 203 of the transaction 152.

Note also that if the total amount specified in all the outputs 203 of a given transaction 152 is greater than the total amount pointed to by all its inputs 202, this is another basis for invalidity in most transaction models. Therefore such transactions will not be propagated nor mined into blocks 151.

Alice and Bob's digital assets consist of the unspent UTXOs locked to them in any transactions 152 anywhere in the blockchain 150. Hence typically, the assets of a given party 103 are scattered throughout the UTXOs of various transactions 152 throughout the blockchain 150. There is no one number stored anywhere in the blockchain 150 that defines the total balance of a given party 103. It is the role of the wallet function in the client application 105 to collate together the values of all the various UTXOs which are locked to the respective party and have not yet been spent in another onward transaction. It can do this by querying the copy of the blockchain 150 as stored at any of the storage nodes 104S, e.g. the storage node 104S that is closest or best connected to the respective party's computer equipment 102.

Note that the script code is often represented schematically (i.e. not the exact language). For example, one may write [Checksig $P_A$] to mean [Checksig $P_A$] =OP_DUP OP_HASH160 <H(Pa)>OP_EQUALVERIFY OP_CHECKSIG. "OP_..." refers to a particular opcode of the Script language. OP_CHECKSIG (also called "Checksig") is a Script opcode that takes two inputs (signature and public key) and verifies the signature's validity using the Elliptic Curve Digital Signature Algorithm (ECDSA). At runtime, any occurrences of signature ('sig') are removed from the script but additional requirements, such as a hash puzzle, remain in the transaction verified by the 'sig' input. As another example, OP_RETURN is an opcode of the Script language for creating an unspendable output of a transaction that can store metadata within the transaction, and thereby record the metadata immutably in the blockchain 150. E.g. the metadata could comprise a document which it is desired to store in the blockchain.

The signature $P_A$ is a digital signature. In embodiments this is based on the ECDSA using the elliptic curve secp256k1. A digital signature signs a particular piece of data. In embodiments, for a given transaction the signature will sign part of the transaction input, and all or part of the transaction output. The particular parts of the outputs it signs depends on the SIGHASH flag. The SIGHASH flag is a 4-byte code included at the end of a signature to select which outputs are signed (and thus fixed at the time of signing).

The locking script is sometimes called "scriptPubKey" referring to the fact that it comprises the public key of the party to whom the respective transaction is locked. The unlocking script is sometimes called "scriptSig" referring to the fact that it supplies the corresponding signature. However, more generally it is not essential in all applications of a blockchain 150 that the condition for a UTXO to be redeemed comprises authenticating a signature. More generally the scripting language could be used to define any one or more conditions. Hence the more general terms "locking script" and "unlocking script" may be preferred.

Optional Side Channel

Figure 3:
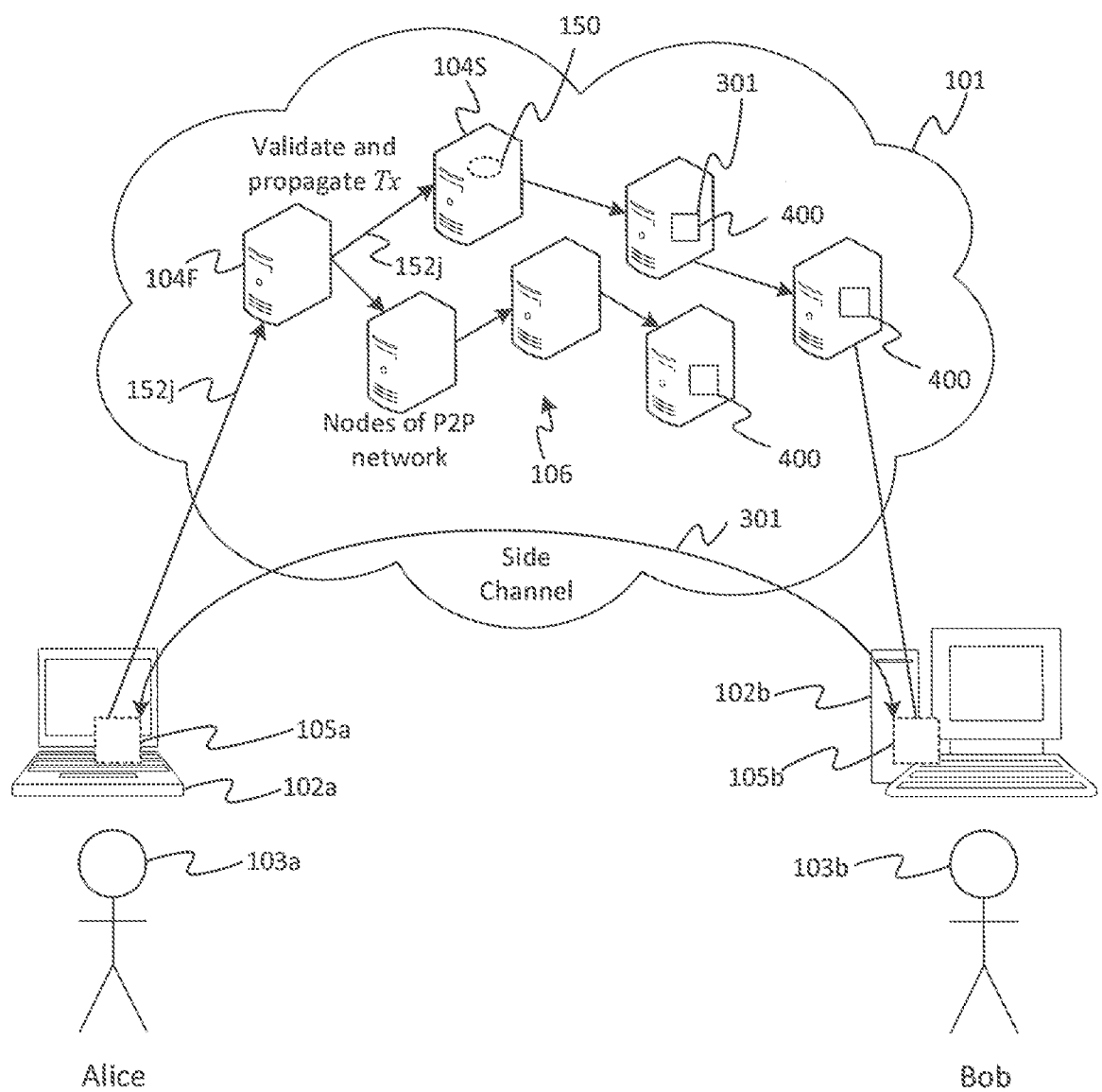
FIG. 3 is a schematic block diagram of another system for implementing a blockchain.

FIG. 3 shows a further system 100 for implementing a blockchain 150. The system 100 is substantially the same as that described in relation to FIG. 1 except that additional communication functionality is involved. The client application on each of Alice and Bob's computer equipment 102a, 120b, respectively, comprises additional communication functionality. That is, it enables Alice 103a to establish a separate side channel 301 with Bob 103b (at the instigation of either party or a third party). The side channel 301 enables exchange of data separately from the P2P network. Such communication is sometimes referred to as "off-chain". For instance this may be used to exchange a transaction 152 between Alice and Bob without the transaction (yet) being published onto the network P2P 106 or making its way onto the chain 150, until one of the parties chooses to broadcast it to the network 106. Alternatively or additionally, the side channel 301 may be used to exchange any other transaction related data, such as keys, negotiated amounts or terms, data content, etc.

The side channel 301 may be established via the same packet-switched network 101 as the P2P overlay network 106. Alternatively or additionally, the side channel 301 may be established via a different network such as a mobile cellular network, or a local area network such as a local wireless network, or even a direct wired or wireless link between Alice and Bob's devices 1021, 102b. Generally, the side channel 301 as referred to anywhere herein may comprise any one or more links via one or more networking technologies or communication media for exchanging data "off-chain", i.e. separately from the P2P overlay network 106. Where more than one link is used, then the bundle or collection of off-chain links as a whole may be referred to as the side channel 301. Note therefore that if it is said that Alice and Bob exchange certain pieces of information or data, or such like, over the side channel 301, then this does not necessarily imply all these pieces of data have to be send over exactly the same link or even the same type of network.

Node Software

Figure 4:
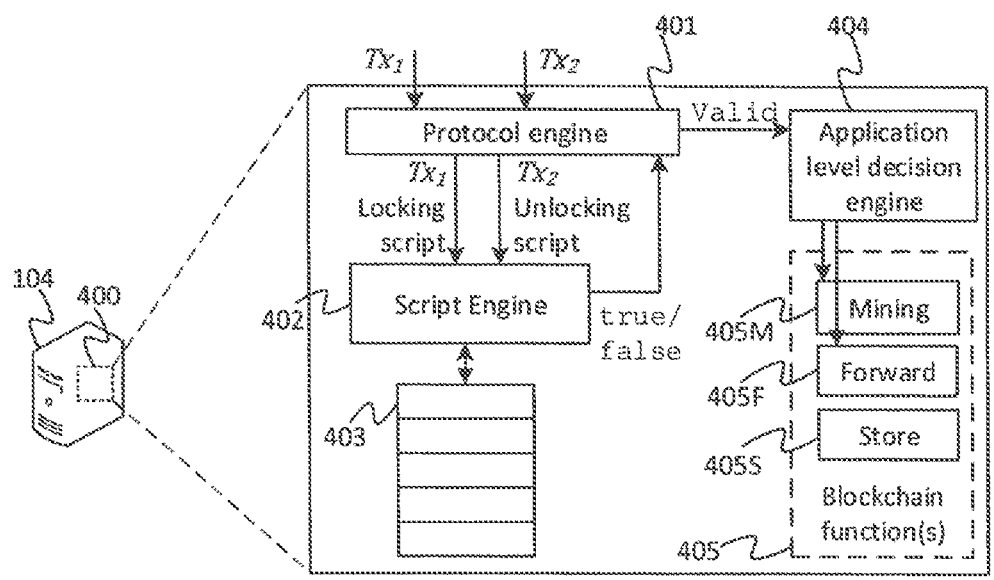
FIG. 4 is a schematic block diagram of a piece of node software for processing transactions in accordance with a node protocol of an output-based model.

FIG. 4 illustrates an example of the node software 400 that is run on each node 104 of the P2P network 106, in the example of a UTXO- or output-based model. The node software 400 comprises a protocol engine 401, a script engine 402, a stack 403, an application-level decision engine 404, and a set of one or more blockchain-related functional modules 405. At any given node 104, these may include any one, two or all three of: a mining module 405M, a forwarding module 405F and a storing module 405S (depending on the role or roles of the node). The protocol engine 401 is configured to recognize the different fields of a transaction 152 and process them in accordance with the node protocol. When a transaction $152m$ ($TX_m$) is received having an input pointing to an output (e.g. UTXO) of another, preceding transaction $152m-1$ ($Tx_{m-1}$), then the protocol engine 401 identifies the unlocking script in $TX_m$ and passes it to the script engine 402. The protocol engine 401 also identifies and retrieves $Tx_{m-1}$ based on the pointer in the input of $TX_m$. It may retrieve $Tx_{m-1}$ from the respective node's own pool 154 of pending transactions if $Tx_{m-1}$ is not already on the blockchain 150, or from a copy of a block 151 in the blockchain 150 stored at the respective node or another node 104 if $Tx_{m-1}$ is already on the blockchain 150. Either way, the script engine 401 identifies the locking script in the pointed-to output of $Tx_{m-1}$ and passes this to the script engine 402.

The script engine 402 thus has the locking script of $Tx_{m-1}$ and the unlocking script from the corresponding input of $TX_m$. For example $Tx_1$ and $Tx_2$ are illustrated in FIG. 4, but the same could apply for any pair of transactions, such as $Tx_0$ and $Tx_1$, etc. The script engine 402 runs the two scripts together as discussed previously, which will include placing data onto and retrieving data from the stack 403 in accordance with the stack-based scripting language being used (e.g. Script).

By running the scripts together, the script engine 402 determines whether the unlocking script meets the one or more criteria defined in the locking script—i.e. does it "unlock" the output in which the locking script is included? The script engine 402 returns a result of this determination to the protocol engine 401. If the script engine 402 determines that the unlocking script does meet the one or more criteria specified in the corresponding locking script, then it returns the result "true". Otherwise it returns the result "false".

In an output-based model, the result "true" from the script engine 402 is one of the conditions for validity of the transaction. Typically there are also one or more further, protocol-level conditions evaluated by the protocol engine 401 that must be met as well; such as that the total amount of digital asset specified in the output(s) of $TX_m$ does not exceed the total amount pointed to by the input(s), and that the pointed-to output of $Tx_{m-1}$ has not already been spent by another valid transaction. The protocol engine 401 evaluates the result from the script engine 402 together with the one or more protocol-level conditions, and only if they are all true does it validate the transaction $TX_m$. The protocol engine 401 outputs an indication of whether the transaction is valid to the application-level decision engine 404. Only on condition that $Tx_m$ is indeed validated, the decision engine 404 may select to control one or both of the mining module 405M and the forwarding module 405F to perform their respective blockchain-related function in respect of $TX_m$. This may comprise the mining module 405M adding $TX_m$ to the node's respective pool 154 for mining into a block 151, and/or the forwarding module 405F forwarding $TX_m$ to another node 104 in the P2P network 106. Note however that in embodiments, while the decision engine 404 will not select to forward or mine an invalid transaction, this does not necessarily mean that, conversely, it is obliged to trigger the mining or the forwarding of a valid transaction simply because it is valid. Optionally, in embodiments the decision engine 404 may apply one or more additional conditions before triggering either or both functions. E.g. if the node is a mining node 104M, the decision engine may only select to mine the transaction on condition that the transaction is both valid and leaves enough of a mining fee.

Note also that the terms "true" and "false" herein do not necessarily limit to returning a result represented in the form of only a single binary digit (bit), though that is certainly one possible implementation. More generally, "true" can refer to any state indicative of a successful or affirmative outcome, and "false" can refer to any state indicative of an unsuccessful or non-affirmative outcome. For instance in an account-based model (not illustrated in FIG. 4), a result of "true" could be indicated by a combination of an implicit, protocol-level) validation of a signature by the node 104 and an additional affirmative output of a smart contract (the overall result being deemed to signal true if both individual outcomes are true).

Identity Verification Protocol

2FA via SMS texts is an increasingly utilised protocol to bolster the security of systems and data. The continued breaches of private and public systems and increasingly stringent data regulations have meant that companies are increasingly encouraging or compelling their customers to provide their phone numbers in order for the customer's data and services to be protected via 2FA protocols. With this phone number, after providing the initial factor (e.g. a password login), an SMS containing an alphanumeric value is sent to the customer's phone. The customer then enters this additional value into the system login, and if correct, the customer is 'authenticated' and given access. The system's security is based on the premise that it is unlikely for a malicious actor to have knowledge of the customer's password as well as be in possession of the customer's phone. However, there has proven to be several vulnerabilities and disadvantages of such a system. One vulnerability is known as "SIM swapping", in which attackers use public information (e.g. name and address) to make a fake identity card, and then use that card at a phone provider's store to impersonate the owner of the phone. This can lead to the attacker being issued with a new sim card with the owner's phone number, allowing the attacker to intercept SMS texts containing the alphanumeric values.

The drawbacks outlined are addressed by the proposed identity verification protocol described herein. The usage of the blockchain removes the need for the middleman of the mobile phone operation, and the transparency of the blockchain means that if, for any reason, a malicious actor does manage to steal a user's private key, the transactions generated using the stolen private key are documented immutably on the blockchain, and can be used as evidence in fraud cases.

Another known example of 2FA is a software-based authenticator that implements two-step verification services where the user (or malicious actor) needs access to the physical device running the authenticator application. While having some advantages over SMS-based protocols, such an authenticator has its disadvantages such as its dependency on the availability of a centralised system and its susceptibility to phishing. In contrast, the identity verification protocol utilises a decentralised system (the blockchain network) resulting in the fact that the failure of any one node does not prevent the system from being available.

As will be described below, embodiments of the present disclosure provide for an identity verification protocol which enables a first party to use signed blockchain transactions as verifying credentials, as well as enabling a second and/or third party to use those signed blockchain transactions to verify the first party's identity. The embodiments may be used as part of a multi-factor authentical protocol.

Figure 5:
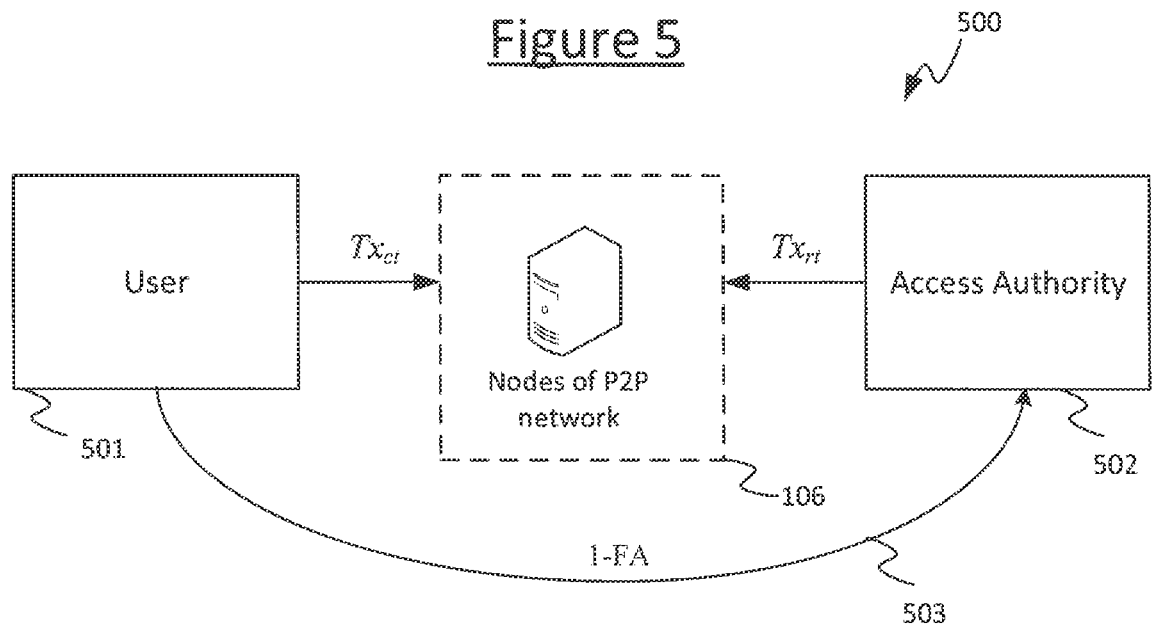
FIG. 5 is a schematic block diagram of a system for verifying an identity of a party using blockchain transactions.

FIG. 5 illustrates an example system 500 for implementing the identity verification protocol. The system comprises a first party 501 and a second party 502 (referred to as a "User" and an "Access Authority" in FIG. 5). The first party 501 operates respective computer equipment comprising a client application configured to generate and transmit blockchain transactions 152 to the blockchain network 106, as well as obtaining blockchain transactions 152, e.g. from the blockchain 150. For example, the first party may take the role of Alice 103a, who operates a wallet application 105a, as described with reference to FIGS. 1 to 3. In the example of FIG. 5, the second party 502 also operates respective computer equipment comprising a client application configured to generate and transmit blockchain transactions 152 to the blockchain network 106, as well as obtaining blockchain transactions 152, e.g. from the blockchain 150. In that case, the second party 502 may take the role of Bob 103b, who operates a wallet application 105b, as described with reference to FIGS. 1 to 3. It will be appreciated that the first and second parties 501, 502 may perform some or all of the actions of both Alice 103a and Bob 103b. That is, in principle the first and second parties 501, 502 may have the same blockchain-related capabilities, and the naming convention is used for illustrative purposes only.

The second party 502 acts as an "access authority", i.e. they control access to a resource or service. For example, the second party 502 may control access to a physical resource, e.g. physical products, or a digital resource, e.g. digital tickets, votes, tokens, etc. Examples of services include online accounts, e.g. bank accounts, email accounts, online retail accounts, etc.; digital streaming services, and so on. The second party 502 may be a retailer, a company, a university, a charity, etc. The first party 501 may be a customer, an employee, a student, a donator, etc.

As an example, the second party 502 may be an owner of a property and the first party 501 may be a holidaymaker who has paid the second party 502 for access to the property for the weekend.

The first party 501 registers a public key with the second party. As discussed above, public keys (and public-private key pairs) will be familiar to the skilled person. For example, the first party 501 may register their public key during their first interaction with the second party 502, e.g. as part of a KYC protocol, or account set-up.

As shown in FIG. 5, the first party 501 provides the second party 502 with one or more first credentials (1-FA). For example, a first credential may be a username, password, credit card, name, address, driving license, passport, memorable word, key card, and so on. The first credential(s) may be provided to the second party 502 over a wired or wireless connection 503, e.g. the side channel 301 described with reference to FIG. 3. For example, the first party may transmit the first credential(s) to the second party via email, SMS text, Wi-Fi, Bluetooth, NFC etc. The first credential(s) may be provided in response to a challenge (or request) from the second party 502, e.g. as part of an online purchase or an account log-in. Alternatively, the first party 501 may provide the first credential(s) to the second party 502 without having received a direct request. For instance, continuing with the example of the first party 501 being a holidaymaker, the first party 501 may present a key card or code (first credential) at an entry point to the property.

In response to receiving the first credential(s), the second party 502 generates a request transaction $Tx_{rt}$ and causes the request transaction $Tx_{rt}$ to be transmitted to the blockchain network 106, e.g. the second party 502 transmits the request transaction $Tx_{rt}$ to one or more nodes of the network 106, or to a different entity who then transmits the request transaction $Tx_{rt}$ to the network 106. The request transaction $Tx_{rt}$ comprises at least a first input and a first output. The request transaction $Tx_{rt}$ may include additional inputs and/or outputs. The first input comprises a signature of the second party 502. That is, the second party 502 signs the transaction with a signature generated using a private key of the second party 502, which may correspond to a public key known to the first party 501 or the public in general. The first output is locked to the registered public key of the first party 501 such that a signature generated using a private key corresponding to the registered public key of the first party 501 is required in order for it to be unlocked and thereby redeemed or spent.

The output may be a P2PKH output comprising a hash of the registered public key (a public key hash). To spend a P2PKH output, an input of the spending transaction must comprise a public key such that the hash (e.g. OP_HASH160) of the public key matches the public key hash in the P2PKH output. In other words, a P2PKH output challenges the spender to provide two items: a public key such that the hash of the public key matches the address in the P2PKH output, and a signature that is valid for the public key and the transaction message, not necessarily in that order.

The first party 501 may obtain the request transaction $Tx_{rt}$ from the second party 502. However, preferably the first party obtains the request transaction $Tx_{rt}$ by scanning the blockchain 150 or the mempool of the blockchain network 106. When a transaction has been conducted over a network, it is transmitted and held in what is known as the mempool (memory pool) until a mining node includes it in the next block 151. Each node on the network 106 operates their own mempool. The request transaction $Tx_{rt}$ can be obtained by scanning the blockchain or the mempool for UTXOs payable to a public key or public key address. In other words, the first party's wallet application scans the blockchain or mempool for transactions payable to its registered public key or a hash of the registered public key.

Upon obtaining the request transaction $Tx_{rt}$, the first party 501 generates a confirmation transaction $Tx_{ct}$. The confirmation transaction $Tx_{ct}$ spends the output of the request transaction $Tx_{rt}$. That is, it references the output of the request transaction $Tx_{rt}$ that is locked to the registered public key of the first party 501. In order to spend the output of the request transaction $Tx_{rt}$, an input of the confirmation transaction $Tx_{ct}$ comprises a signature generated using a private key corresponding to the registered public key. Depending on the type of output of the request transaction $Tx_{rt}$, the input may also comprise the registered public key. This will be the case if the output is a P2PKH output. The confirmation transaction $Tx_{ct}$ comprises an output which may be locked to the second party 502, to the first party 501, or to a different party. Preferably the output is locked to the second party 502 so that the second party (i.e. the second party's wallet application) can scan the blockchain or mempool for UTXOs payable to a public key (or hash thereof) of the second party 502.

In response to obtaining the confirmation transaction $Tx_{ct}$, and optionally in additional to any further verification steps, the second party 502 grants access to the resource or service to the first party 501.

Thus the presence of the confirmation transaction $Tx_{ct}$ in the blockchain 150 or mempool acts as an additional credential or authentication factor for verifying the identity of the first party 501.

Figure 6:
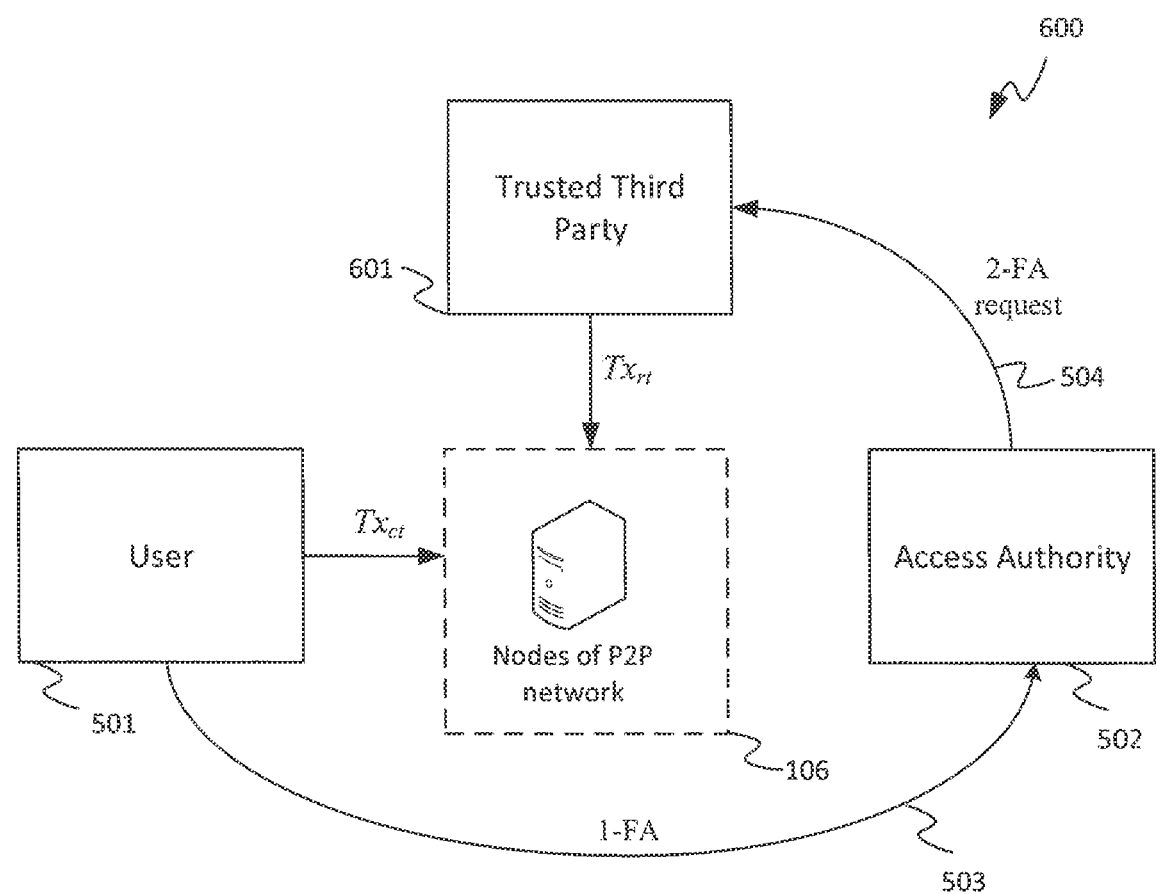
FIG. 6 is a schematic block diagram of another system for verifying an identity of a party using blockchain transactions.

FIG. 6 illustrates another example system 600 for implementing the identity verification protocol. The system of FIG. 6 involves a third party (referred to as a "trusted third party") 601. In this example, the second party (the access authority) 502 still controls access to the resource or service, but the responsibility for registering the public key of the first party 501 and generating the request transaction is delegated to the third party 601. The third party 601 may be a certificate authority, e.g. a party trusted to certify public keys. For example, the third party may conduct rigorous initial identity checks on an individual to link the individual with their public key. As an example, the third party 601 may conduct a face-to-face meeting with the first party 501 to check they match an official document, e.g. a passport or driving license.

In this example, the second party 502 may or may not operate computer equipment which is configured to access the blockchain network, whereas the third party 601 does operate respective computer equipment comprising a client application configured to generate and transmit blockchain transactions 152 to the blockchain network 106, as well as obtaining blockchain transactions 152, e.g. from the blockchain 150. Effectively, the third party 601 may perform some or all of the actions attributed to Alice 103a or Bob 103b described with reference to FIGS. 1 to 3.

Note that in the example of FIG. 5, the actions attributed to the third party 601 discussed below may be performed by the second party 502, i.e. in that example the second party 502 and the third party 601 are the same party.

The first party 501 provides one or more first credentials to the second party 502, e.g. in response to a request for said first credential(s). The second party transmits a request (2FA-request) to the third party 601 to verify the identity of the user reporting to be the first party 501. The 2FA-request may be transmitted via a side channel 504, e.g. the internet, or using a blockchain transaction 152.

The third party 601 generates the request transaction $Tx_{rt}$. As set out above, the request transaction comprises an output locked to the registered public key of the first party 501. The difference between the example of FIG. 5 and this example is that the input of the request transaction $Tx_{rt}$ comprises a signature generated by the third party 601. However, it is not excluded that the request transaction could comprise a respective signature from both the second party 502 and the third party 601. The third party 601 transmits the request transaction $Tx_{rt}$ to the blockchain network 106.

The first party 501 obtains the request transaction $Tx_{rt}$, e.g. by scanning the blockchain 150 or the mempool, generates the confirmation transaction $Tx_{ct}$, and transmits the confirmation transaction $Tx_{ct}$ to the blockchain network 106.

The third party 601 determines whether the confirmation transaction $Tx_{ct}$ has been transmitted to the blockchain network 106, e.g. by scanning the blockchain 150 or by scanning the mempool of one or more nodes of the network 106. If the confirmation transaction $Tx_{ct}$ has been recorded in the blockchain or is present in one or more respective mempools, the third party sends an indication to the second party that informs the second party 502 that the first party's identity has been verified. For instance, the third party 601 may transmit an indication over the side channel 504, or transmit a blockchain transaction 152 comprising the indication to the second party 502. In some examples, the third party 601 will only transmit the indication once the confirmation transaction $Tx_{ct}$ (and therefore the request transaction $Tx_{rt}$) has been recorded in the blockchain 150.

In response to receiving the indication, the second party 502 grants the first party 501 with access to the resource or service.

Figure 7:
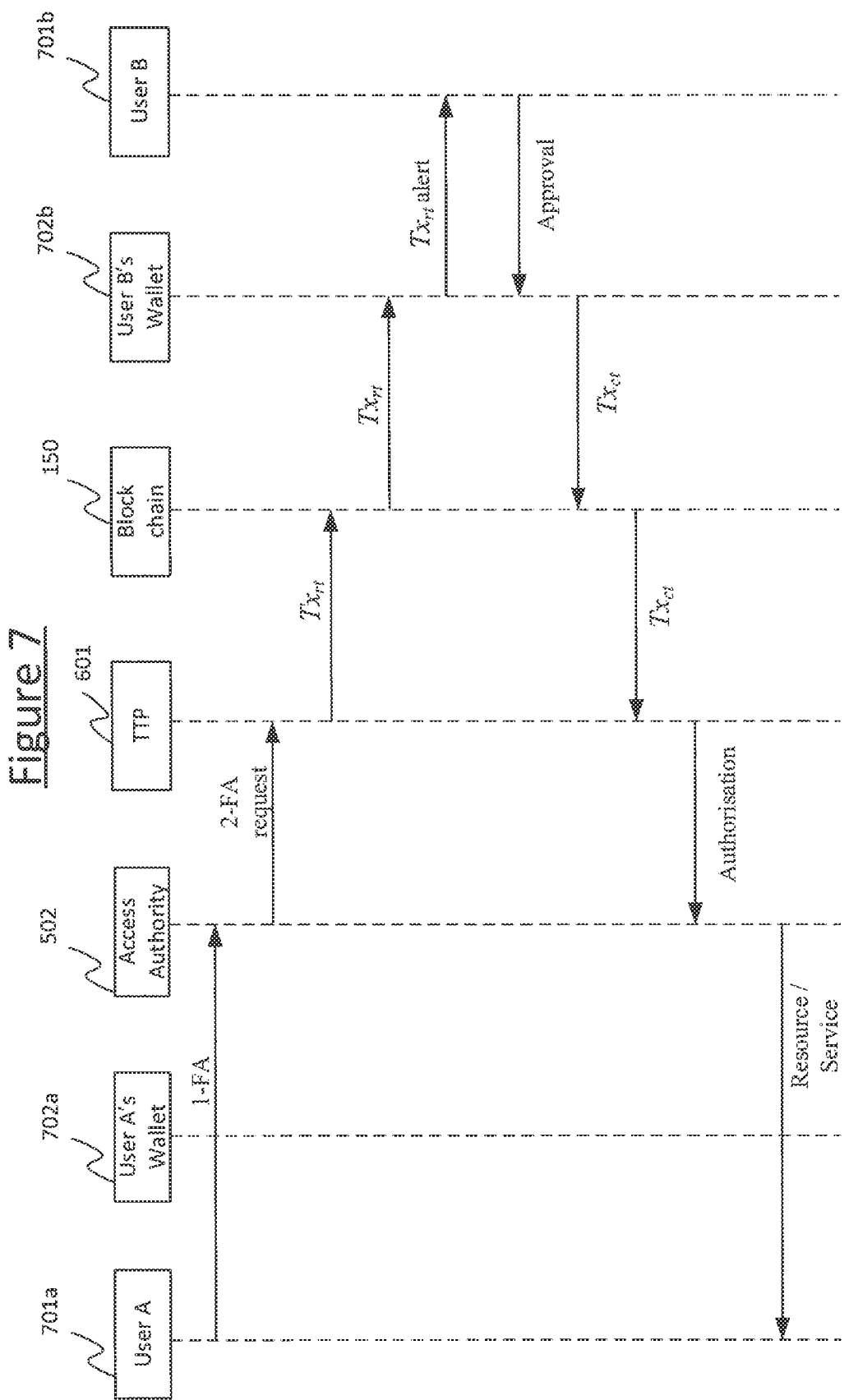
FIG. 7 is a sequence diagram for an example method for verifying an identity of a party using blockchain transactions that are obtained from a blockchain.

FIG. 7 illustrates an example sequence diagram for verifying the identity of the first party 501. FIG. 7 illustrates how the first party may comprise two different users, "user A" 701a who operates a respective wallet application 702a (although not essential) and "user B" 701b who operates a respective wallet application 702b. In cases where the first party 501 comprises a single user, user A 701a is the same user as user B 701b.

User A 701a provides one or more credentials to the access authority 502. The access authority transmits a request to the trusted third party 601 to verify the identity of user A. The trusted third party 601 transmits a request transaction $Tx_{rt}$ to the blockchain 150 locked to user B's public key. User B's wallet application 702b obtains the request transaction $Tx_{rt}$ from the blockchain 150 and informs user B 701a of the request to provide a second credential. User B generates a confirmation transaction $Tx_{ct}$ using the wallet application 702b, and the wallet application 702b transmits the confirmation transaction $Tx_{ct}$ to the blockchain 150. The trusted third party 601 obtains the confirmation transaction $Tx_{ct}$ from the blockchain 150 and sends an indication to the access authority 502 that the first party's identity has been verified. The access authority 502 grants access to a resource or service to user A 701a. In this example, user B 701b attests to the identity of user A 701a. For example, user A may be a child wishing to make a purchase from a merchant, or access content on a streaming service, and user B may be a parent who can first decide whether access the purchase or access is appropriate, and then attest to the child's identity. Preferably however, user A is user B, and user A is providing the confirmation transaction to verify their own identity.

As an optional feature, the output of the request transaction that is locked to the public key of the first party may additionally be locked to a public key of the party that generated the request transaction, i.e. the second party 502 or the third party 601. In that case, the output is a multi-signature output. A multi-signature (also known as a multi-sig) output challenges an input of a spending transaction to contain a signature corresponding to n-of-m public keys in the multi-sig output. Therefore, in these examples, the output may be unlocked (i.e. spent) by the first party 501. The output may alternatively be unlocked by the second party 502 or the third party 601 (depending on which party generated the request transaction). For example, if the second party 502 generated the request transaction, the output may be a 1-of -2 multi-sig output, which can be unlocked independently by the first party 501 or the second party 502. Note that once the output has been unlocked (i.e. spent) by one of the parties, it cannot then be unlocked (i.e. double-spent) by the other party. In the case of the first party 501 unlocking the multi-sig output, the spending transaction is the confirmation transaction. In the case of the second or third party 502, 601 unlocking the multi-sig output, the spending transaction is a cancel transaction. The cancel transaction allows the second or third party 502, 601 to remove the request transaction from the UTXO set, e.g. if a period of time has passed since the request transaction was submitted to the network 106.

As another optional feature, and in order to increase privacy for the first party 502, the first party 502 may register a first public key with the second or third party 502, 601, and the second or third party may lock the output of the request transaction to a second public key generated based on the first public key. The second public key is generated in a predetermined way known to both the first party 501 and the second or third party 502, 601. This allows the first party 501 to be able to scan the blockchain 150 or mempool for the second public key or a hash thereof in order to obtain the request transaction. For example, the first party 501 may generate a pseudorandom number and share it with the second or third party 502, 601, or vice versa. The pseudorandom number may be combined with the first public key to generate the second public key. Depending on the public key scheme used, the pseudorandom number may first have to be multiplied by a generator point, e.g. if an ECDSA scheme is used. The pseudorandom number may be shared between the parties using a Diffie-Hellman exchange, or a variation thereof. If the first party 501 subsequently interacts with the second party 502, e.g. to gain access to another resource or service, the second or third party may apply the same pseudorandom number to the second public key in order to generate a third public key, and lock an output of a subsequent request transaction to the third public key.

Another optional feature is the use of a challenge in the output of the request transaction $Tx_{rt}$. The challenge challenges the input of the confirmation transaction $Tx_{ct}$ to comprise a predetermined response. Note that this challenge is in additional to the requirement that the input of the confirmation transaction $Tx_{ct}$ comprises a signature of the first party 501.

First, the first party 501 may transmit a message to the second party 502, or the second party 502 may transmit the message to the first party 501. In some examples, the first party 501 and the second party 502 may jointly generate the message by exchanging information. The message may comprise details of the identity verification request, e.g. information regarding the resource or service the first party 501 is attempting to access, time and/or date information, etc. In general, the message may contain any form of information. In some examples the message comprises the pseudorandom number used to generate the second public key. The message may be sent in an encrypted form, in which case the first party 501 and second party 502 must know, or share, the decryption key. Method for sharing a decryption key will be familiar to the skilled person. One such method is a Diffie-Hellman exchange.

The first party 501, upon obtaining the request transaction $Tx_{rt}$, may determine whether the request transaction $Tx_{rt}$ comprises the message its original form (i.e. as plaintext) or its encrypted form (e.g. as ciphertext). Alternatively, the first party 501 may determine whether the request transaction $Tx_{rt}$ comprises a hash (or multi-hash) of the message in its original or encrypted form. A multi-hash is the result of the application of a hash function to a message two or more times. Note that a particular hash-function may itself hash a message more than once. In general, applying a multi-hash function, e.g. a double-hash function, may comprise applying a first hash function one or more times, followed by applying a second hash function one or more times, where the first and second hash functions may be the same hash functions or different hash functions. In addition, the first and/or second hash functions may themselves apply a hash function one or more times. The notation $H^2(X)$ is used below to refer to applying a double-hash function to a message X, where $H^2(X)=H^A(H^B(X))$ and where $H^A$ and $H^B$ may be the same or different hash (or multi-hash) functions. As an example, the hash function H160 is itself a hash function that makes use of two different hash functions, RIPEMD160 and SHA256, i.e. hash160(X)=RIPEMD160 (SHA256(X)).

The first party 501 may only generate the confirmation transaction $Tx_{ct}$ if the request transaction $Tx_{rt}$ comprises the expected message or an expected hash (which may be a multi-hash) of the message. Preferably, the first party 501 may only generate the confirmation transaction $Tx_{ct}$ if the request transaction $Tx_{rt}$ comprises a double-hash of the message. In the case that the third party 601 generates the request transaction $Tx_{rt}$, the second party 502 shares the message or (multi-) hash thereof with the third party 601.

The output of the request transaction $Tx_{rt}$ may comprise the expected message or an expected hash (which may be a mulit-hash) of the message. Preferably the output comprises a challenge which requires knowledge of the message in order for the input of the confirmation transaction $Tx_{ct}$ to unlock that output. For example, the output may comprise a hash puzzle. A hash puzzle takes an input value, applies a hash function to the input value and compares it a predetermined hash. If the hash of the input value matches the predetermined hash, a value of 1 or "true" or the like is output. The inclusion of a hash puzzle in the output of a transaction requires the input of a spending transaction to comprise the exact input value (or pre-image) that hashes to the predetermined hash.

As an example, if the output of the request transaction $Tx_{rt}$ comprises a hash of the message, the input of the confirmation transaction $Tx_{ct}$ would be required to include the message itself. If the output of the request transaction $Tx_{rt}$ comprises a double-hash of the message, the input of the confirmation transaction $Tx_{ct}$ would be required to include the hash of the message. Generally, the input of the confirmation transaction $Tx_{ct}$ is required to include the pre-image of the (multi-) hash included in the output of the request transaction $Tx_{rt}$.

The following examples describe the use of the identity verification protocol in a two-factor authentication system.

In this example, the user is in the process of purchasing an item (which is referred to below as a "sale transaction") and is expected to sign a blockchain transaction that indicates that they give permission for a credit card transaction to proceed. After the production of such a signed transaction, the credit card company and or business are then expected to proceed with completing the sale. The sale requires use of payment cards for FIAT currency and the first credential (or factor) is the payment (credit or debit) card itself (or at least the relevant numbers).

Preferably, several key aspects must be taken into consideration when implementing a MFA system. Efforts must be made to prevent malicious actors from compromising the system and having it produce undesired outcomes. Individuals in many, if not most cases, would prefer not to have the details of their financial transactions in the public domain. It would be desirable that the 2FA process be completed in a short period of time. A certain amount of transparency may be desired for the purposes of auditing if there ends up being disagreements between parties.

A single design a 2FAB solution may not be able to satisfy, to the fullest, each of the above criteria simultaneously. As such a base design is presented after which additional designs are presented that target the aforementioned considerations.

The following acronyms are used in the following examples. PF1 701a (e.g. the first party 501) is the individual seeking to pay for goods or services. This includes someone in store taking a basket of goods to a cashier or it could be someone making an online purchase from an internet-enabled device. WF1 702a is the blockchain wallet of PF1. This wallet is responsible for accessing and submitting transactions to the blockchain 150 on behalf of PF1. WF1 is also able to calculate hashes of strings/text, as well as store and record these hashes and the associated text. The business 703 (e.g. second party 502) is the company that PF1 is to pay for goods and service. The bank 704 (e.g. third party 601) represents an institution that issues, governs, and manages the usage of credit/debit cards. PF2 701b is the individual responsible for signing the confirmation transaction that represents the second factor. PF2 may be the same person as PF1. In fact, this is the desired option—the same individual proving the first and second factors. However, PF1 and PF2 are not always the same individuals. For this reason, PF1 and PF2 are represented throughout the WP as having their own identity, allowing for instances when they are not the same person. WF2 702b is the blockchain wallet of PF2. This wallet is responsible for accessing and submitting transactions to the blockchain on behalf of PF2. WF2 is also able to observe the blockchain for any 2FA request from the bank, and then communicating this request to PF2.

The following assumptions are made in order to facilitate the design of the 2FA system. First, on being granted a credit card by the credit card company or bank 704, an individual is registered with a public key (e.g. an ECDSA public key). This public key is tied to the individual's bank account. The user may register a new public key (replacing the previous public key) with the bank if the user or bank, for security reasons or otherwise, requires this. The second assumption is that on being granted a credit card by the bank 704, the individual and the bank come to a mutual agreement on a secret value S that the bank 704 would utilise if there is a need/request to encrypt sale transaction data on the blockchain. This secret S may be securely generated and exchanged using Diffie Heiman protocol between the credit card holder and the bank 704, and is tied to the card holder's account. The user may re-engage with the bank 704 and generate a new secret value S (replacing the previous secret value) if the user or bank 704, for security reasons or otherwise, believe that the previous S is compromised.

Figure 8:
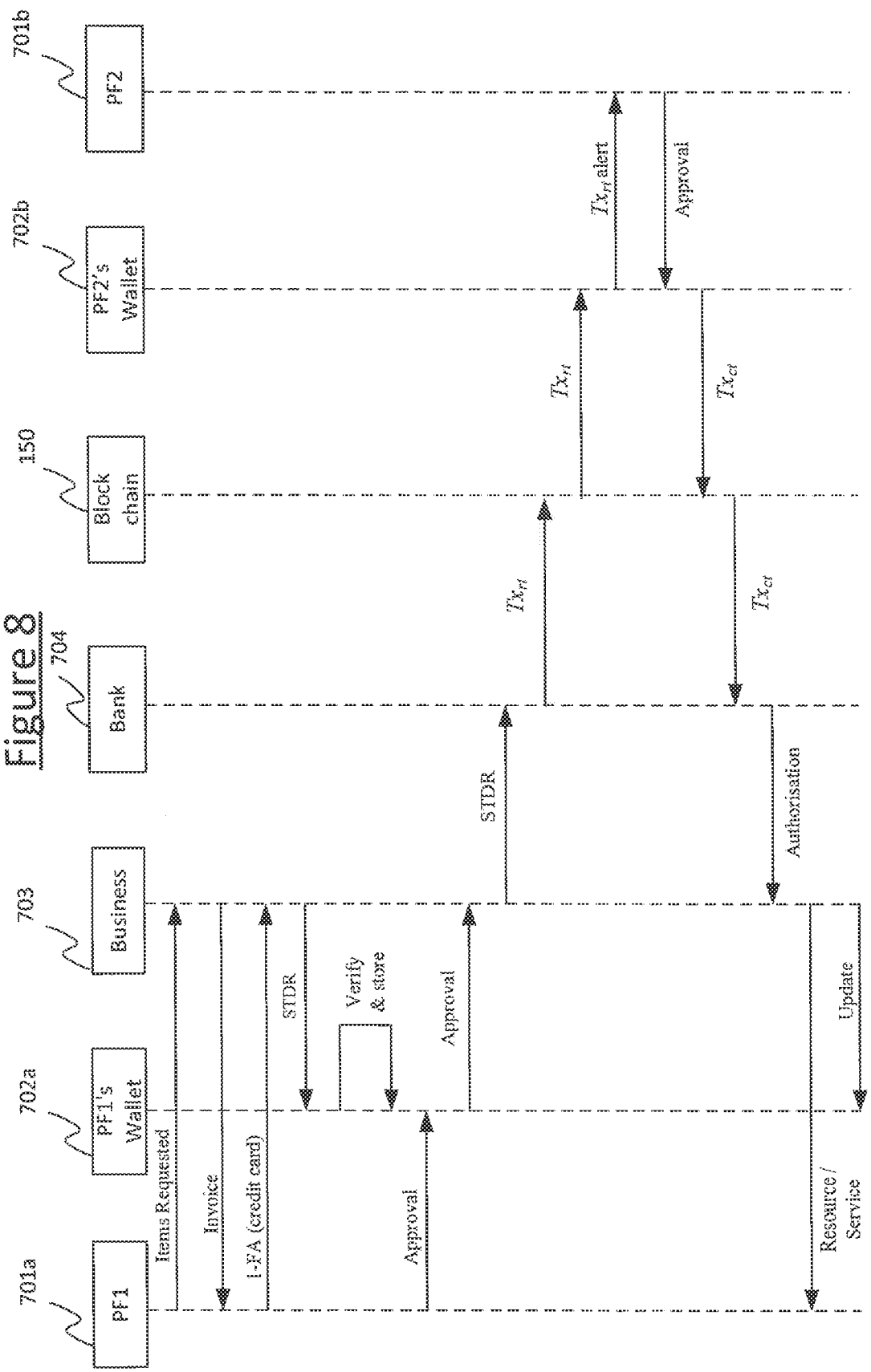
FIG. 8 is a sequence diagram for another example method for verifying an identity of a party using blockchain transactions that are obtained from a blockchain.

An example sequence diagram for a 2FA system is shown in FIG. 8. The first three steps (from top to bottom) represent the interaction between PF1 and the business 703 when the person has decided on a basket of goods and services. Here PF1, having decided on the items required, presents this list, in the form of a formal purchase order or otherwise, to the business 703. The business 703 constructs an invoice or bill that is communicated to PF1 (the invoice is expected to include the business's identification information). If PF1 is satisfied with the details of the invoice, then PF1 gives the business 703 his necessary credit card details. Note that the purchase order, invoice, credit card do not necessarily have to be physically given to the other party; these could be communicated through the use of electronic devices such as card readers, cash register, mobile phones etc. After the business 703 has the credit card information, the cashier constructs a message, e.g. a formal 'digital representation of the sale transaction' (STDR). This may be a combination of the invoice and PF1's credit card information. The business 703 produces a summary (i.e. a hash) of the transaction H(STDR) and communicates this to PF1. PF1 is required to be in possession of a computing device, e.g. smartphone, that would be able to check whether the H(STDR) value is correct. This functionality may be performed by WF1 available on the smartphone. Assuming the H(STDR) has been calculated correctly, the wallet will keep a record of this hash and the STDR itself, in anticipation for a 2FA request further down the line.

Assuming PF1 confirms the H(STDR) value, the business 703 can then proceed with processing the user's credit card. The business 703 passes on the STDR information to PF1's Bank 704.

The bank 704 validates the information (e.g. business identifier, credit card information, STDR format, etc.), and retrieves the public key that is currently registered for that credit card ($P_{CC}=v_{CC}G$), where $v_{CC}$ is the private key and G is a generator point. After said validation, the bank 704 produces a double-hash of the STDR, $H^2$ (STDR), using a hash function such as H(·)=SHA256, and creates a '2FA request transaction' ($Tx_{rt}$) to be submitted to the blockchain where an output (labelled as output-2FA for illustrative purposes) of said transaction is 'locked' utilising the double hash. The '2FA request transaction' $Tx_{rt}$ is the transaction that is a formal request by the bank 704 for a second authenticating factor for the sale transaction. The second factor that is being 'requested' is a digital signature (ECDSA) produced by $P_{CC}$ that signs a blockchain transaction. To spend the previously mentioned output output-2FA, this digital signature must be present in the input script of the spending transaction utilising said output. An example of $Tx_{rt}$ is provided in the following table:

| TxID | | | |
|---|---|---|---|
| Inputs | | Outputs | |
| Value | Script | Value | Script |
| y | <Sig($P_{Bank}$)> <$P_{Bank}$> | y | OP_SHA256 <$H^2$(STDR)> OP_EQUALVERIFY OP_DUP OP_HASH160 <H($P_{CC}$)> OP_EQUALVERIFY OP_CHECKSIG |
| | | 0 or | OP_RETURN |

-continued

| TxID | | | |
|---|---|---|---|
| Inputs | | Outputs | |
| Value | Script | Value | Script |
| | | minimum value | <2FAB-ID> <Tx$_{rt}$-ID> <Bank-ID> <e$_S$(STDR)> <STDR> |

For the Tx$_{rt}$, the transaction's input is signed by the Bank 704 with a public key $P_{Bank}=V_{bank}G$ that is expected to be known and trusted by all stakeholders of the proposed system. There are two outputs to the transaction—the first is the output-2FA and the second is an unspendable (e.g. OP_RETURN) output. The unspendable output is for the purpose of storing metadata related to the transaction. There are alternate ways of storing metadata within a transaction other than OP_RETURN outputs. The OP_RETURN output shows examples of meta data that may be included within the transaction. These are described in the following table.

| Metadata | Description |
|---|---|
| <2FA-ID> | This represents a protocol flag to indicate that the transaction is a 2FA transaction. |
| <Tx$_{rt}$-ID> | This represents a protocol flag to indicate that the transaction is specifically a 2FA request transaction. |
| <Bank-ID> | This is an identifier of the bank or credit card issuer. This may be optional if stakeholders are willing to accept the public key and signature in the input of the Tx$_{rt}$ transaction as a bank identifier. |
| <e$_s$(iSTDR)> | This is an encryption of the sale transaction details, accomplished utilising the secret value S. If the SDTR is not included in the transaction Tx$_{rt}$, it is expected that PF1's wallet has kept a record of the STDR from the initial interaction between PF1 and the business, and, if applicable, communicated this STDR to PF2. |
| <SDTR> | Optionally, the raw STDR could be placed in the transaction rather than its encrypted form. However, this is unlikely to be a preferred option due to privacy concerns. |

For the output-2FA, this is protected by the locking script replicated below

OP_SHA256 <H²(SDTR)> OP_EQUALVERIFY OP_DUP OP_HASH160 <H(P$_{CC}$)> OP_EQUALVERIFY OP_CHECKSIG

The first half of this script asks for the pre-image of the H²(STDR), which would be H(STDR), and the second half asks for the ECDSA signature Sig(P$_{CC}$) that was tied to the public key registered to the credit card. Suppose there is a scenario where PF2 is not aware of the 2FA-request or is unwilling to confirm the transaction (e.g. because they do no recall and approve of the sale transaction), the request transaction Tx$_{rt}$ can be altered as follows. One way is to allow the bank 704 to have the option of spending output-2FA of the transaction Tx$_{rt}$. After a certain time period, e.g. at the bank's discretion, if PF2 has not spent output-2FA (i.e. provided the second authenticating factor), then the bank 704 can 'refund' the output-2FA to the itself. The locking script of output-2FA would thus be adjusted to allow for both the bank 704 or PF2 to unlock the output.

OP_SHA256 <H²(STDR)> OP_EQUALVERIFY <1> <P$_{Bank}$> <P$_{CC}$> <2> OP_CHECKMULTISIG As shown in the Script above, this may be done by including an m-of-n multsig condition that asks for a signature for either of two public keys, P$_{Bank}$, or P$_{CC}$. Here the locking script begins with the number of valid signatures that are required (m), then lists the set of n public keys for which m signatures must correspond, then the value n, and the opcode OP_CHECKMULTISIG that checks if all m signatures are valid. This way the bank 704 can spend the output-2FA if necessary. After its creation the transaction Tx$_{rt}$ is then submitted to the blockchain by the bank 704.

When Tx$_{rt}$ is successfully mined (i.e. included a block 151 on the blockchain 150) then PF2's wallet (WF2), which is constantly scanning the blockchain (UTXOs) for 2FA requests, will eventually notice the existence of the transaction on the blockchain 150, and alert PF2 to the existence of this request. The wallet WF2 will be seeking specifically for transactions that include an output-2FA that targets P$_{CC}$, and optionally the <2FAB-ID><Tx$_{rt}$-ID>.

Assuming that PF2 is PF1 (in tandem wallet WF2 would be WF1), the wallet would be able to check that a stored H(STDR) received from the point of initial contact between PF1 and the business 703 corresponds with the decrypted version of the STDR in the OP_RETURN output, as well as the $H^2$(STDR) in the output-2FA. If the values correspond (or not) and PF2 wants to proceed with sale transaction, then PF2 selects that option in the wallet WF2.

On PF2's instruction, WF2 creates a transaction $Tx_{ct}$. This transaction would be the 2FA confirmation transaction. This transaction is the formal confirmation that PF2 gives their approval to the bank 704 for the completion of the sales transaction.

| TxID | | | |
|---|---|---|---|
| Inputs | | Outputs | |
| Value | Script | Value | Script |
| y | <Sig($P_{CC}$)> <($P_{CC}$)><br><H(STDR)><br>Or (if output-2FA is m-of-n locked)<br>0 <Sig($P_{CC}$)> <H(STDR)> | y | OP_DUP OP_HASH160<br><H($P_{Bank}$)> OP_EQUALVERIFY<br>OP_CHECKSIG |
| | | 0 or minimum value | OP_RETURN<br><2FAB-ID> <2FA-ct-ID> |

The input of the $Tx_{ct}$ transaction is output-2FA of $Tx_{rt}$. The unlocking script of output-2FA would thus be:

$$\langle Sig(P_{CC})\rangle\langle P_{CC}\rangle\langle H(STDR)\rangle$$

Or, if the bank 704 is allowed to cancel $Tx_{rt}$:

$$0\langle sigP_{CC}\rangle\langle H(STDR)\rangle$$

PF2 must include a signature of the transaction utilising the private key $v_{CC}$. In addition, PF2 must provide H(STDR). PF2's inclusion of this hash value is a way of PF2 ascertaining that they are responding to the exact sales transaction they should. Note that if there is any character changed in the STDR then this would produce a completely different hash value.

Included in the transactions may be at least one output that returns the y value to the bank 704. A second OP_RETURN output may be employed to store required metadata. The metadata may include <2FAB-ID> to indicate that the transaction is a 2FAB transaction and <$Tx_{ct}$-ID> to indicate that the transaction is specifically a 2FAB confirmation transaction. The transaction would be submitted to the blockchain.

When $Tx_{ct}$ is successfully mined then the bank 704, whose wallet software is constantly scanning the blockchain 150 for $Tx_{ct}$, will eventually notice the existence of $TX_{ct}$ on the blockchain 150. The bank 704 will be seeking specifically transactions that include an output that targets the bank's public key $P_{Bank}$, and optionally the <2FAB-ID><2FA-ct-ID>tags.

The bank 704 undertakes whatever other non-2FA validation processes it needs to do, adjusts the user's credit card balance accordingly, then sends a signed authorisation to the business 703 that the sales transaction has been approved by the bank 704. The authorisation may be in the form of a blockchain transaction. The business 703 then gives the user the goods or service.

In the example of FIG. 8, there is a delay related to the time taken for a transaction to be confirmed on the blockchain 150. For proof-of-work blockchains, the average time for a transaction to be mined (i.e. included in the blockchain 150) is ten minutes. The combination of the request transaction $Tx_{rt}$ and the confirmation transaction $TX_{ct}$ being mined means that from the initial interaction between PF1 in formulating the details of the sale, it would take around twenty minutes before the customer is given the rights to the goods or service. This may be impractical in some circumstances.

Nodes of the blockchain network 106 store unconfirmed transactions they receive in a database called the unconfirmed transactions memory pool, often referred to simply as the mempool. Not all received transactions are added to the mempool. If a transaction double-spends an input of another transaction already in the mempool, it is dropped. A transaction is also dropped if it is not a standard transaction. Once a node receives a new block, or mines a block itself, the unconfirmed transactions memory pool is updated, removing all transactions included in the block. When a transaction is created, it is relayed to the blockchain network 106 through a small amount of nodes. The nodes that receive the new transaction check that it is valid and is not a double-spend of a transaction already in the mempool. If the transaction passes the check, it is relayed to other nodes in the network, and is otherwise dropped. The mempool essentially acts as a temporary store for transactions awaiting confirmation in the blockchain. It is maintained by nodes of the blockchain network 106 who check the validity of the transactions (including formatting and double-spend). Each node keeps a copy of the mempool, passes on new valid transactions to other nodes, and accepts valid transactions form other nodes into its version of the mempool.

Given this validation process being performed by each of the nodes on the transactions in their respective mempools, the presence of a transaction in multiple mempools may be considered as a, not perfect but sufficient, legitimization of the transaction. The legitimacy of transactions in the mempool is particularly applicable to proof-of-work blockchains where the first (valid) transaction broadcast is the one included in the next block. Given that a transaction being uploaded, validated, and broadcast across nodes happens very quickly-nearly instantly—if the intended recipient of a payment is willing to accept a transaction in the mempool as being valid (despite not being mined) with a sufficient level of confidence, then that drastically reduces the time between a transaction being sent by the payer and a transaction being 'visible and accepted' by the payee. Not only does the mempool store valid transactions that spend UTXOs of mined transactions, mempools also store, and accept as valid, transactions that spend outputs of transactions that are in the mempool but not yet mined. This can create a chain of transactions in the mempool where each transaction spends the output(s) of the previous transaction, and the first transaction is the only one that spends an output of a mined transaction. Currently, this chain can be as long as twenty-five transactions.

Figure 9:
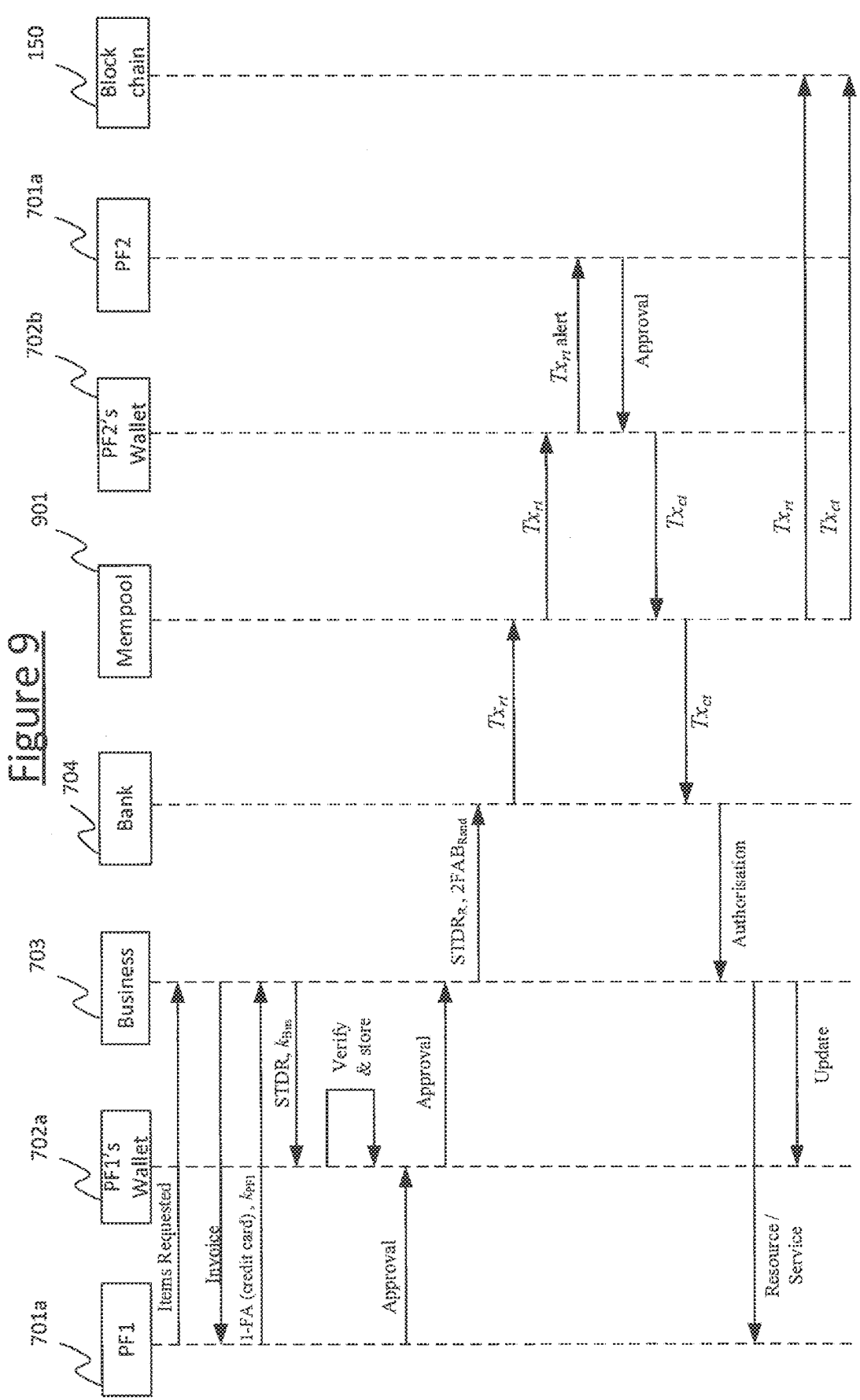
FIG. 9 is a sequence diagram for an example method for verifying an identity of a party using blockchain transactions that are obtained from a memory pool (mempool) of transactions.

FIG. 9 illustrates a sequence diagram for a modified 2FA protocol which utilizes the mempool. In this example, WF2 scans the mempool 901 (and the blockchain 150) and alerts PF2 if there is a confirmation request for PF2. If PF2 is willing to provide the second authentication factor, then PF2 signs a confirmation transaction $Tx_{ct}$ that spends output-2FA of the transaction $Tx_{rt}$ in the mempool. PF2 submits the transaction to the mempool.

The bank's wallet scans the mempool for such 2FA confirmation transactions and the bank 704 informs the business 703 to proceed with the sales transaction if $Tx_{ct}$ is indeed present in the mempool for the sales transaction.

Figure 10:
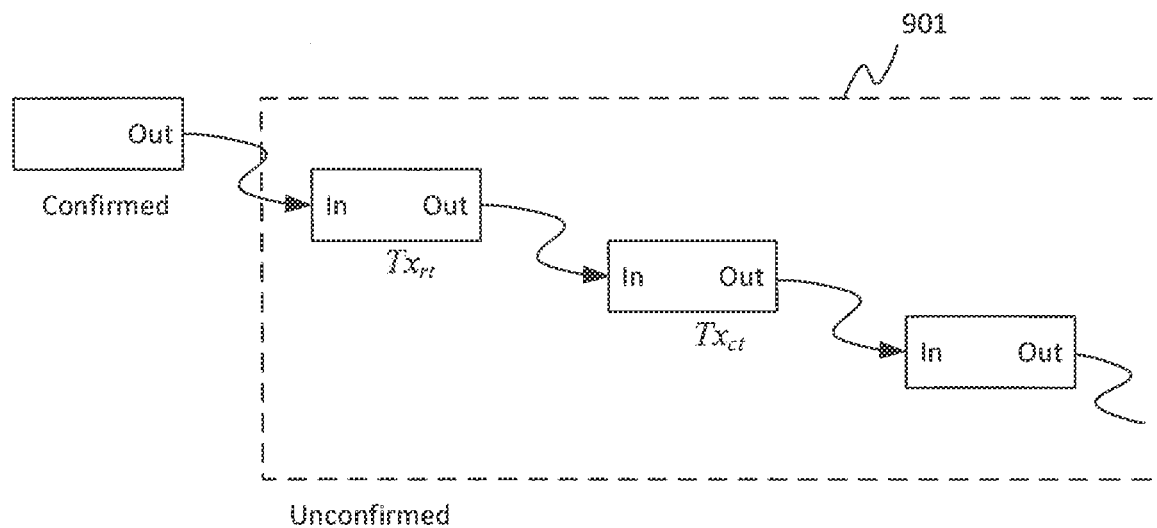
FIG. 10 schematically illustrates a chain of unconfirmed transactions in the mempool.
Figure 11:
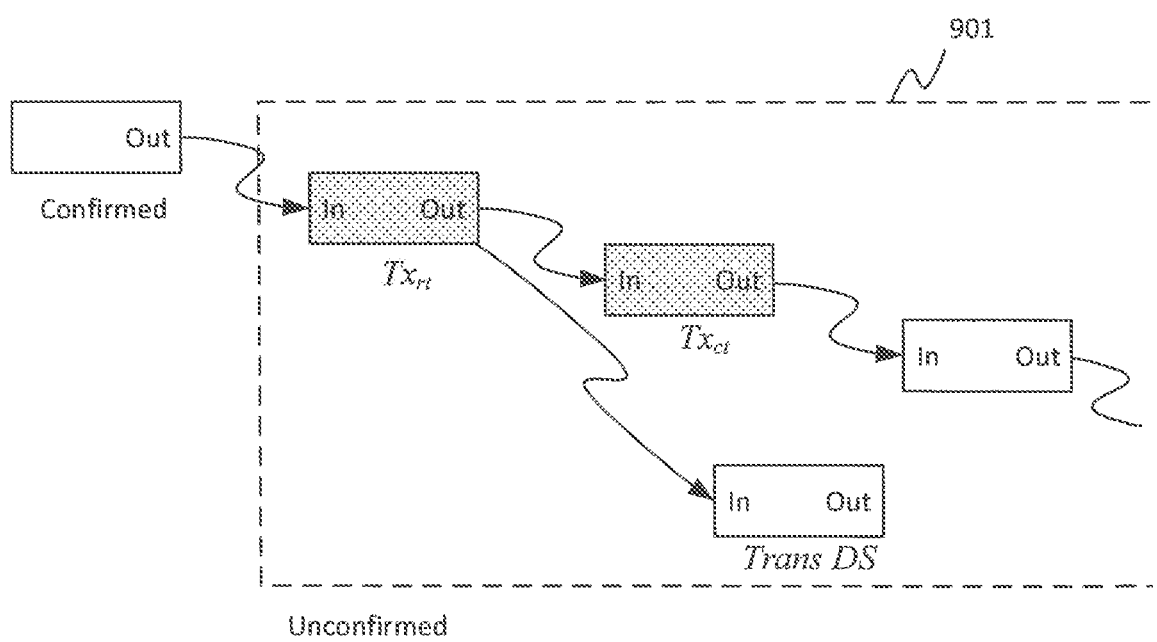
FIG. 11 schematically illustrates a double-spend attempt on a transaction in the mempool.

FIG. 10 illustrates a chain of unconfirmed transactions in the mempool 901. FIG. 11 illustrates a double-spend attempt on a request transaction in the mempool 901. The main concern in 'accepting' transactions in the mempool as valid (for the MFA protocol or in general) is the threat of a double-spend. A double-spend is where a transaction, e.g. "Trans DS", spends the same output as another, e.g. $Tx_{ct}$, resulting in $Tx_{ct}$ being deemed 'invalid' and removed from the mempool 901 of the nodes, never to be mined or included in a block. A double-spend however has proven difficult or impractical to accomplish in practice. That being said, even if a double-spend is successful, this does not pose a problem for the MFA protocol. The second factor that the sales transaction needs is a signed $Tx_{ct}$ using $V_{cc}$. If the bank 704 sees a $v_{cc}$-signed $Tx_{ct}$ in the mempool, even if that transaction is never confirmed into a block (due to a double-spend or otherwise), it is still true that PF2 has signed the transaction $Tx_{ct}$. This can be taken as sufficient confirmation of the second factor. The mempool 901 in such an understanding would act as a communication medium for the request and confirmation transactions, as illustrated in FIG. 12. For their convenience, the bank 704 may save a copy of the $Tx_{ct}$ in their records in the event of a double-spend and the transaction is never mined. This can be made available for audits or disputes. In most cases however, in around ten minutes after their respective submissions, $Tx_{rt}$ and $Tx_{ct}$ will be mined into the blockchain.

Some parties (e.g. customers and businesses) may require or desire a certain level of privacy when carrying out a sales transaction. In the previously described implementations, certain measures were taken to protect customer privacy, e.g. the details of the sales transaction (STDR) need not necessarily be included in the transactions but instead hashes and/or encrypted versions of the sales transaction (STDR) may be used. These measures are desirable given that the blockchain 150 is public and immutable. The locking script of output-2FA may contain the double hash ($H^2$(STDR)) in a way that mandates the hash H(STDR) be present in the spending transaction's ($Tx_{ct}$) input script. If a malicious actor is able to determine the raw STDR, the actor would be able to identify every other sales transaction represented on the blockchain 150 if the STDR is the same. To prevent this, it would be prudent to make each STDR unique. In some examples, the STDR is composed of one or more of the following pieces of information: an invoice (details on what is being purchased), credit card details, and a business ID (information that identifies business 703, e.g. name, address, registration number, etc.)

If the customer repeatedly buys the same item from the same store using the same credit card, then the there is a danger that the STDR is the same each time. To distinguish between each sales transaction, some unique data may be included in the STDR. In some cases, the invoice for the sales transaction will includes a unique identifier generally referred to as an "invoice number". This would address the need for a unique STDR, but only to a certain extent. If the number is simply incremented by a fixed value each time a new sales transaction is created, then it would be computationally easy for an interested party to identify each new sales transaction that 'buys the same items from the same business 703 using the same card'. If the number is a random number chosen from a sufficiently large set that there is a low probability of duplication, then this would be ideal. The date-time value of the time of the transaction can also be used as a way of producing unique STDR hashes. However, this faces the same challenge that the date-time is a value that increments in a predictable way. For this reason, if one knows at least one STDR, one can iterate the date-time and calculate and identify the hashes of sales transactions that 'buys the same items from the same business using the same card'. The random number (2FAB_Rand) being an ID of the sales transaction is a preferred option. This could be, as previously described, created by the business 703, or it could be a random number produced by person PF1. As another option, it could be a random number jointly generated with input from both the business 703 and PF1 in their initial interactions. The process of generation and validation of 2FAB_Rand could be incorporated in the interaction between PF1 and the business 703, as shown in FIG. 9.

Consider the use of the random values of PF1 and the business as $k_{PF}1$, and $k_{Bus}$ where $$0 < k_{PF}1, k_{Bus} < q$$

where q is a large prime number.

The value 2FAB_Rand could then be $$2FAB\_Rand = (k_{PF}1 + k_{Bus}) \bmod q$$

The revised STDR ($STDR_R$) value would now be revised to be $$STDR_R = STDR \| 2FAB\_Rand$$

where || represents concatenation.

The 2FAB_Rand value is expected to be stored in PF1s wallet. In some instances, the 2FAB_Rand value may be included as metadata in the 2FAB-rt transaction, e.g. encrypted using the value S.

In addition to concerns about the uniqueness of the STDR, there is also concern about the uniqueness of the $P_{CC}$ public key. Recall that the owner of the credit card registers a public key $P_{CC}$ with the bank 704 at the time of being granted the card. If each 2FA transaction is sent to the same value $P_{CC}$ then an interested (possibly malicious) party, while not knowing what exactly was bought, if they are ever able to deanonymize the $P_{CC}$ card owner, will be able to easily track every purchase that person PF1 makes. Given the impracticality of communicating and registering a new $P_{CC}$ value with the bank 704 before every sales transaction that PF1 makes, other options of utilising unique $P_{CC}$ values may be explored. For example, the 2FAB_Rand value described previously may be used to generate new public keys. Assuming the agreement by all parties on an Elliptic Curve and a set of parameters (e.g. the secp256$k$1 elliptic curve) which include:

G—a base point on the elliptic curve with order q: q×G=0; and q—a large prime number, then the $P_{CC}$ public key could be revised to be $$P^*_{CC} = P_{CC} + (2FAB_{Rand})G = v_{CC}G + (2FAB_{Rand})G = (v_{CC} + 2FAB_{Rand})G$$

The output output-2FA of the request transaction $Tx_{rt}$ would be revised so that is addressed to the public key $P_{CC}^*$. The customer PF1/PF2 would be responsible for retaining knowledge of 2FAB_Rand in order to pair this value with $v_{CC}$ to create the signature necessary to successfully submit the confirmation transaction $Tx_{cr}$. The business 703 would be responsible for communicating the value $2FAB_{Rand}G$ to the bank 704.

The present disclosure describes an identity verification protocol (e.g. a MFA protocol) that utilises a blockchain transaction as the second authentication factor. The request for a second authentication factor is represented in a blockchain transaction and the confirmation of knowledge of that second authentication factor is expected to be achieved by the intended recipient submitting a confirmation transaction that spends an output of the request transaction.

Utilisation of the blockchain introduces its own complications, the first being in the long (z10 minute) waiting times for a transaction to be confirmed into a block. The protocol addresses this by allowing for unconfirmed transactions in the mempool to be considered as legitimate for the purposes of the protocol. This applies to the request transaction and to the confirmation transaction spending the outputs of the unconfirmed request transaction. Accepting unconfirmed transactions makes the authenticating process almost instant. In such a scenario the blockchain acts as a communication medium for the request and confirmation transformation with, importantly, an almost certain probability that both transactions will eventually be confirmed on the blockchain.

Another concern with the usage of blockchain is that of privacy. Customers may be reluctant to have third parties being able to identify their purchases. The MFA protocol mitigates these concerns by including the usage of a random number generated for each unique event (sales transaction). This unique random value is used to disguise the public key to which the 2FA request is being sent, as well as disguise the representation of the event details.

In addition to mitigating limitations inherent to blockchain 150, the MFA protocol offers advantages over existing solutions. The fact that the blockchain 150 is a decentralised system means that there is no reliance on the availability of a single point of failure. At the same time, the transparency and immutability of the blockchain 150 mean that proof would exist of 2FA requests and confirmations that have been sent. Auditing related to regulatory bodies, government, or legal entities are readily facilitated on any inquest related to MFA confirmations or lack thereof, i.e. a bank cannot deny they sent a request transaction, and PF2/PF1 cannot deny that a confirmation transaction has been signed. A malicious actor cannot secretly provide 2FA confirmations without PF2/PF1 being aware. If the bank or business process a sales transaction without a confirmation transaction signed by PF1/PF2, this will be evident.

While the protocol has been described in terms of sales transactions utilising fiat currency, the protocol may be appropriated to govern other "transactions" that require MFA authentication, e.g. secure access to a file or physical building. In such a consideration:

a sales transaction is replaced by a generic event;

the business is now described as a gatekeeper or access authority; and the bank is now described as a trusted third party of a certificate authority and is seen as any entity or system responsible for, inter alia, registering PF1's public key.

Conclusion

It will be appreciated that the above embodiments have been described by way of example only. More generally there may be provided a method, apparatus or program in accordance with any one or more of the following Statements.

Statement 1. A method of providing credentials to enable a second party to verify an identity of a first party, wherein the first party is associated with a first public key, wherein the first public key is registered with a third party, and wherein the method comprises:

providing one or more first credentials to the second party;

obtaining a request transaction, the request transaction being a blockchain transaction comprising a) an input comprising a signature generated based on a respective private key of the third party, and b) an output locked to a second public key of the first party, wherein the second public key is based on the first public key;

generating a confirmation transaction, the confirmation transaction being a blockchain transaction comprising an input that references the output of the request transaction, and a signature generated based on a private key corresponding to the second public key of the first party; and causing the confirmation transaction to be transmitted to one or more nodes of a blockchain network for inclusion in a blockchain.

Examples of the one or more first credentials include: a username, a password, a biometric identifier, a phone number, an address, a code received (from the third party) in an SMS text, a payment card (or information thereof), bank details, a memorable word, etc.

Statement 2. The method of statement 1, wherein said obtaining comprises obtaining the request transaction from the blockchain.

Statement 3. The method of statement 1, wherein said obtaining comprises obtaining the request transaction from a respective memory pool of one or more nodes of the blockchain network, wherein each respective memory pool comprises a respective set of unconfirmed blockchain transactions.

Statement 4. The method of any preceding statement, wherein said providing of the one or more first credentials is in response to receiving an identity challenge from the second party.

Statement 5. The method of any preceding statement, wherein said causing comprises transmitting the transaction to the one or more nodes of the blockchain network.

Statement 6. The method of any preceding statement, comprising:

receiving from or transmitting to the second party, at least one of a message and/or a hash of the message; and determining whether the request transaction comprises at least one of the message, the hash of the message, and/or a multi-hash of the message, and wherein said generating of the confirmation transaction is conditional on the request transaction comprising at least one of the message, the hash of the message, and/or a pre-image of the multi-hash of the message.

Statement 7. The method of statement 6, wherein the output of the request transaction comprises a challenge requiring knowledge of the message and/or the hash of the message in order to be unlocked, and wherein the input of the confirmation transaction comprises the message, the hash of the message and/or a pre-image of the multi-hash of the message.

Statement 8. The method of statement 6 or statement 7, wherein the message comprises a first pseudorandom number.

Statement 9. The method of any of statements 1 to 8, wherein the second public key is generated by combining the first public key with a second pseudorandom number.

Statement 10. The method of any of statements 1 to 8, wherein the second public key is the first public key.

Statement 11. The method of statement 8 or statement 9, wherein the first and/or second pseudorandom number is based on a third pseudorandom number generated by the first party and a fourth pseudorandom number generated by the second party.

Statement 12. The method of statement 9 or statement 11, wherein the second pseudorandom number is the first pseudorandom number.

Statement 13. The method of any preceding statement, wherein the third party is the second party.

Statement 14. A method of verifying an identify of a first party, wherein the first party is associated with a first public key, wherein the first public key is registered with a third party, and wherein the method comprises:
receiving a request to verify the identity of the first party;
generating a request transaction, the request transaction being a blockchain transaction comprising a) an input comprising a signature generated based on a respective private key of the third party, and b) an output locked to a second public key of the first party, wherein the second public key is based on the first public key;
causing the request transaction to be transmitted to one or more nodes of a blockchain network for inclusion in a blockchain; and
determining whether a confirmation transaction has been transmitted to one or more nodes of the blockchain network for inclusion in the blockchain, the confirmation transaction being a blockchain transaction comprising an input that references the output of the request transaction, and a signature generated based on a private key corresponding to the second public key of the first party.

The request may be a blockchain transaction.

Statement 15. The method of statement 14, wherein said determining whether the confirmation transaction has been transmitted to one or more nodes of the blockchain network for inclusion in the blockchain comprises:
determining whether the confirmation transaction is included in the blockchain.

Statement 16. The method of statement 15, wherein said determining whether the confirmation transaction has been transmitted to one or more nodes of the blockchain network for inclusion in the blockchain comprises:
determining whether the confirmation transaction is included in a respective memory pool of one or more nodes of the blockchain network, wherein each respective memory pool comprises a respective set of unconfirmed blockchain transactions.

Statement 17. The method of any of statements 14 to 16, comprising:
verifying the identity of the first party based on whether the confirmation transaction has been transmitted to one or more nodes of the blockchain network.

Statement 18. The method of statement 17, wherein the request is received from a second party, and wherein the method comprises:
transmitting an indication to the second party that the identity of the first party has been verified.

The indication may be a blockchain transaction.

Statement 19. The method of statement 18, wherein receiving the request comprises receiving an indication that the first party has provided one or more first credentials to the second party.

Statement 20. The method of statement 18 or statement 19, wherein the request comprises at least one of a message or a hash of the message, and wherein the output of the request transaction comprises a challenge requiring knowledge of the message and/or the hash of the message in order to be unlocked.

Statement 21. The method of statement 20, wherein the message comprises a first pseudorandom number.

Statement 22. The method of any of statements 14 to 21, wherein the second public key is generated by combining the first public key with a second pseudorandom number.

Statement 23. The method of statement 21 or statement 22, wherein the first and/or second pseudorandom number is based on a third pseudorandom number generated by the first party and a fourth pseudorandom number generated by the third party.

Statement 24. The method of any of statements 14 to 21, wherein the second public key is the first public key.

Statement 25. The method of any of statements 14 to 24, wherein the output of the request transaction is locked to the second public key of the first party or a public key of the third party.

Statement 26. The method of statement 25, comprising:
generating a cancel transaction, the cancel transaction being a blockchain transaction comprising an input that references the output of the request transaction, and a signature generated based on a private key corresponding to the public key of the first party; and
causing the cancel transaction to be transmitted to one or more nodes of the blockchain network for inclusion in the blockchain.

Statement 27. The method of statement 17 and any statement dependent thereon, wherein the second party controls access or ownership of a resource or service, and wherein access or ownership of the resource or service is granted to the first party based on said verification of the identity of the first party.

Examples of a resource or service include physical or digital goods, an email account, a social media or other online account, a streaming service, a digital token (e.g. a ticket or vote), etc.

Statement 28. The method of any of statements 14 to 27, wherein the second party is the third party.

Statement 29. Computer equipment comprising:
memory comprising one or more memory units; and
processing apparatus comprising one or more processing units, wherein the memory stores code arranged to run on the processing apparatus, the code being configured so as when on the processing apparatus to perform the method of any of statements 1 to 28.

Statement 30. A computer program embodied on computer-readable storage and configured so as, when run on computer equipment of statement 29, to perform the method of any of statements 1 to 28.

Other variants may become apparent to a person skilled in the art once given the disclosure herein. The scope of the present disclosure is not limited by the disclosed embodiments but only by the accompanying claims.

The invention claimed is:

1. A method of providing credentials to enable a second party to verify an identity of a first party, wherein the first party is associated with a first public key, wherein the first public key is registered with a third party, and wherein the method is performed by the first party and comprises:
   providing one or more first credentials to the second party;
   obtaining a request transaction, the request transaction being a first blockchain transaction that has been transmitted to one or more nodes of a blockchain network and comprising a) an input comprising a signature generated based on a respective private key of the third party, and b) an output locked to a second public key of the first party, wherein the second public key is generated by i) multiplying a pseudorandom number with a generator point of an Elliptic Curve Digital Signature Algorithm, ECDSA, scheme to generate a third public key, and ii) combining the third public key with the first public key to generate the second public key;
   generating a confirmation transaction, the confirmation transaction being a second blockchain transaction comprising an input that references the output of the request transaction, and a signature generated based on a private key corresponding to the second public key of the first party; and
   causing the confirmation transaction to be transmitted to one or more nodes of a blockchain network for inclusion in a blockchain.

2. The method of claim 1, wherein said obtaining comprises:
   obtaining the request transaction from the blockchain; or
   obtaining the request transaction from a respective memory pool of one or more nodes of the blockchain network, wherein each respective memory pool comprises a respective set of unconfirmed blockchain transactions.

3. The method of claim 1, comprising:
   receiving from or transmitting to the second party, at least one of a message and/or a hash of the message; and
   determining whether the request transaction comprises at least one of the message, the hash of the message, and/or a multi-hash of the message, and wherein said generating of the confirmation transaction is conditional on the request transaction comprising at least one of the message, the hash of the message, and/or a pre-image of the multi-hash of the message.

4. The method of claim 3, wherein the output of the request transaction comprises a challenge requiring knowledge of the message and/or the hash of the message in order to be unlocked, and wherein the input of the confirmation transaction comprises the message, the hash of the message and/or a pre-image of the multi-hash of the message.

5. The method of claim 3, wherein the message comprises the pseudorandom number, or wherein the message comprises a first pseudorandom number and the pseudorandom number is generated based on the first pseudorandom number.

6. A method of verifying an identity of a first party, wherein the first party is associated with a first public key, wherein the first public key is registered with a third party, and wherein the method is performed by the third party and comprises:
   receiving a request to verify the identity of the first party;
   generating a request transaction, the request transaction being a first blockchain transaction comprising a) an input comprising a signature generated based on a respective private key of the third party, and b) an output locked to a second public key of the first party, wherein the second public key is generated by i) multiplying a pseudorandom number with a generator point of an Elliptic Curve Digital Signature Algorithm, ECDSA, scheme to generate a third public key, and ii) combining the third public key with the first public key to generate the second public key;
   causing the request transaction to be transmitted to one or more nodes of a blockchain network for inclusion in a blockchain; and
   determining whether a confirmation transaction has been transmitted to one or more nodes of the blockchain network for inclusion in the blockchain, the confirmation transaction being a second blockchain transaction comprising an input that references the output of the request transaction, and a signature generated based on a private key corresponding to the second public key of the first party.

7. The method of claim 6, wherein said determining whether the confirmation transaction has been transmitted to one or more nodes of the blockchain network for inclusion in the blockchain comprises:
   determining whether the confirmation transaction is included in the blockchain.

8. The method of claim 7, wherein said determining whether the confirmation transaction has been transmitted to one or more nodes of the blockchain network for inclusion in the blockchain comprises:
   determining whether the confirmation transaction is included in a respective memory pool of one or more nodes of the blockchain network, wherein each respective memory pool comprises a respective set of unconfirmed blockchain transactions.

9. The method of claim 6, comprising:
   verifying the identity of the first party based on whether the confirmation transaction has been transmitted to one or more nodes of the blockchain network.

10. The method of claim 9, wherein the request is received from a second party, and wherein the method comprises:
    transmitting an indication to the second party that the identity of the first party has been verified.

11. The method of claim 10, wherein receiving the request comprises receiving an indication that the first party has provided one or more first credentials to the second party.

12. The method of claim 10, wherein the request comprises at least one of a message or a hash of the message, and wherein the output of the request transaction comprises a challenge requiring knowledge of the message and/or the hash of the message in order to be unlocked.

13. The method of claim 12, wherein the message comprises a first pseudorandom number.

14. The method of claim 9, wherein the second party controls access or ownership of a resource or service, and wherein access or ownership of the resource or service is granted to the first party based on said verification of the identity of the first party.

15. The method of claim 6, wherein the second public key is generated by combining the first public key with a second pseudorandom number.

16. The method of claim 15, wherein the first pseudorandom number and/or the second pseudorandom number is based on a third pseudorandom number generated by the first party and a fourth pseudorandom number generated by the third party.

17. The method of claim 6, wherein the output of the request transaction is locked to the second public key of the first party or a public key of the third party.

18. The method of claim 17, comprising:
generating a cancel transaction, the cancel transaction being a third blockchain transaction comprising an input that references the output of the request transaction, and a signature generated based on a private key corresponding to the public key of the first party; and
causing the cancel transaction to be transmitted to one or more nodes of the blockchain network for inclusion in the blockchain.

19. Computer equipment, comprising:
memory comprising one or more memory units; and
processing apparatus comprising one or more processing units, wherein the memory stores code arranged to run on the processing apparatus, the code being configured so as when the code is run on the processing apparatus the processing apparatus performs a method of verifying an identity of a first party, wherein the first party is associated with a first public key, wherein the first public key is registered with a third party, and wherein the method is performed by the third party and comprises:
receiving a request to verify the identity of the first party;
generating a request transaction, the request transaction being a first blockchain transaction comprising a) an input comprising a signature generated based on a respective private key of the third party, and b) an output locked to a second public key of the first party, wherein the second public key is generated by i) multiplying a pseudorandom number with a generator point of an Elliptic Curve Digital Signature Algorithm, ECDSA, scheme to generate a third public key, and ii) combining the third public key with the first public key to generate the second public key;
causing the request transaction to be transmitted to one or more nodes of a blockchain network for inclusion in a blockchain; and
determining whether a confirmation transaction has been transmitted to one or more nodes of the blockchain network for inclusion in the blockchain, the confirmation transaction being a second blockchain transaction comprising an input that references the output of the request transaction, and a signature generated based on a private key corresponding to the second public key of the first party.

20. A non-transitory computer-readable storage medium having instructions stored thereon and configured so as, when run on computer equipment, the instructions causes the computer equipment to perform a method of verifying an identity of a first party, wherein the first party is associated with a first public key, wherein the first public key is registered with a third party, and wherein the method is performed by the third party and comprises:
receiving a request to verify the identity of the first party;
generating a request transaction, the request transaction being a first blockchain transaction comprising a) an input comprising a signature generated based on a respective private key of the third party, and b) an output locked to a second public key of the first party, wherein the second public key is generated by i) multiplying a pseudorandom number with a generator point of an Elliptic Curve Digital Signature Algorithm, ECDSA, scheme to generate a third public key, and ii) combining the third public key with the first public key to generate the second public key;
causing the request transaction to be transmitted to one or more nodes of a blockchain network for inclusion in a blockchain; and
determining whether a confirmation transaction has been transmitted to one or more nodes of the blockchain network for inclusion in the blockchain, the confirmation transaction being a second blockchain transaction comprising an input that references the output of the request transaction, and a signature generated based on a private key corresponding to the second public key of the first party.

* * * * *